United States Patent [19]

Sugawara

[11] Patent Number: 5,257,134
[45] Date of Patent: Oct. 26, 1993

[54] ZOOM LENS
[75] Inventor: Saburo Sugawara, Kanagawa, Japan
[73] Assignee: Canon Kabushiki Kaisha, Tokyo, Japan
[21] Appl. No.: 906,933
[22] Filed: Jun. 3, 1992
[30] Foreign Application Priority Data Jul. 12, 1991 [JP] Japan .................. 3-198777

[51] Int. Cl.$^5$ .................. G02B 15/14; G02B 9/14
[52] U.S. Cl. .................. 359/679; 359/684; 359/690; 359/786; 359/787; 359/788
[58] Field of Search .............. 359/786, 787, 789, 679, 359/685, 690, 687, 684

[56] References Cited

U.S. PATENT DOCUMENTS

| | | | |
|---|---|---|---|
| 4,118,108 | 10/1978 | Muszumanski | 359/690 |
| 4,478,496 | 10/1984 | Kato | 359/690 |
| 5,103,343 | 4/1992 | Sekita | 359/684 |
| 5,134,524 | 7/1992 | Hamano et al. | 359/687 |

*Primary Examiner*—Martin Lerner
*Assistant Examiner*—David R. Parsons
*Attorney, Agent, or Firm*—Fitzpatrick, Cella, Harper & Scinto

[57] ABSTRACT

A zoom lens for the projector includes, in order from a screen, a first lens unit of positive refractive power, a second lens unit of negative refractive power and a third lens unit of positive refractive power, zooming from the wide-angle end to the telephoto end being performed by axially moving the second and third lens units in such a manner that the air separation between the first and second lens unit increases, while the air separation between the second and third lens units decreases, and the following conditions being satisfied:

$$1 < -\beta 3w < 1.5$$

$$0.8 < -\beta 2w < 1.2$$

$$0.25 < -f2/fw < 0.45$$

$$0.7 < e2w/fw < 1.1$$

where $\beta 2w$ and $\beta 3w$ are the image magnifications for an infinitely distant object of the second and third lens units in the wide-angle end, respectively, f2 is the focal length of the second lens unit, e2w is the interval between the principal points of the second and third lens units, and fw is the shortest focal length of the entire lens system.

6 Claims, 14 Drawing Sheets

ZOOM LENS

BACKGROUND OF THE INVENTION

Field of the Invention

This invention relates to zoom lenses and, more particularly, to a zoom lens of simple form suitable for, for example, a projection lens in a color-liquid-crystal projection television system for projecting an image displayed on the color liquid crystal onto a screen.

Description of the Related Art

In the past, there have been proposed a wide variety of color-liquid-crystal projection television systems in which a plurality of images displayed on the respective color liquid crystals are optically superimposed and the thus combined image is projected by a projection lens onto a screen.

FIG. 27 is a schematic diagram of the main parts of a general color-liquid-crystal projection television system for projection of the images formed on the color liquid crystals.

In FIG. 27, a white light source 1 is arranged to issue a collimated light bundle. Reference numerals 2a, 2b and 2c denote liquid crystal display elements for red, green and blue, respectively. Reflection mirrors 3a and 3b and a red-reflection dichroic mirror 4 illuminate the liquid crystal display element 2a for red. A green-reflection dichroic mirror 5 illuminates the liquid crystal display element 2b for green.

The liquid crystal display element 2c for blue is illuminated with a blue light bundle which has passed through the red-reflection dichroic mirror 4 and the green-reflection dichroic mirror 5. Reference numeral 6 denotes a blue-reflection dichroic mirror. Reference numeral 7 denotes a projection lens.

In FIG. 27, a white light bundle issued from the white light source 1 is separated into color light bundles of red, green and blue by the dichroic mirrors (4, 5, 6). With these red, green and blue light bundles, the liquid crystal display elements (2a, 2b, 2c) for red, green and blue are illuminated, respectively. Images displayed on the liquid crystal display elements (2a, 2b, 2c) on the basis of the respective color light bundles are projected by the projection lens 7 in a superimposed relation onto a screen (not shown). Thus, a color picture is formed on the screen.

In a projection lens used in such an arrangement, since many optical members such as reflection mirrors and dichroic mirrors have to be disposed in a space between the last lens surface of the projection lens and the liquid crystal display elements (i.e., within the back focal distance), the projection lens is required to have a long back focal distance.

In order for the projector shown in FIG. 27 to project images displayed on the liquid crystal display elements onto the screen with various projection magnifications, the projection lens is usually formed into a wide-angle zoom lens, as the entirety of the projector is minimized in size and the projection magnification can rapidly be changed to any desired value.

As the zoom lens used as the projection lens, mention may be made of, for example, a two-unit zoom lens comprising a first lens unit of negative refractive power and a second lens unit of positive refractive power. The two-unit zoom lens has a relatively wide angle of view and a good optical performance, while preserving the relatively long back focal distance.

However, the use of this two-unit zoom lens causes an increase of the amount of movement of the second lens unit, which in turn causes the total length of the entire lens system to become long, thus giving rise to a problem of increasing the bulk and size of the entire lens system. Further, a zoom lens adapted to a large-sized screen such as a projection zoom lens for the high-definition television system has another problem that lateral chromatic aberration and other aberrations are difficult to correct well.

SUMMARY OF THE INVENTION

The present invention makes use of three lens units as a whole and sets forth a proper lens design for each unit so that the angular coverage of projection is wide and the long back focal distance is easily obtained in such a manner that the optical performance is well maintained. Nonetheless, the bulk and size of the entire lens system is easy to minimize. Accordingly, it is an object of the invention to provide a zoom lens suited to the color-liquid-crystal projector.

A zoom lens according to the invention comprises, in order from a first conjugate point at a longer distance (screen), a first lens unit of positive refractive power, a second lens unit of negative refractive power and a third lens unit of positive refractive power, wherein zooming from a wide-angle end to a telephoto end is performed by axially moving the second and third lens units in such a manner that an air separation between the first and second lens units increases and an air separation between the second and third lens units decreases, and wherein letting image magnifications for an infinitely distant object of the second and third lens units in the wide-angle end be denoted by $\beta 2w$ and $\beta 3w$, respectively, the focal length of the second lens unit by f2, a principal point interval between the second and third lens units in the wide-angle end by e2w and, the shortest focal length of the entire lens system by fw, the following conditions are satisfied:

$$1 < -\beta 3w < 1.5 \quad (1)$$

$$0.8 < -\beta 2w < 1.2 \quad (2)$$

$$0.25 < -f2/fw < 0.45 \quad (3)$$

$$0.7 < e2w/fw < 1.1 \quad (4)$$

DETAILED DESCRIPTION OF THE PREFERRED EMBODIMENTS

Figure 1:
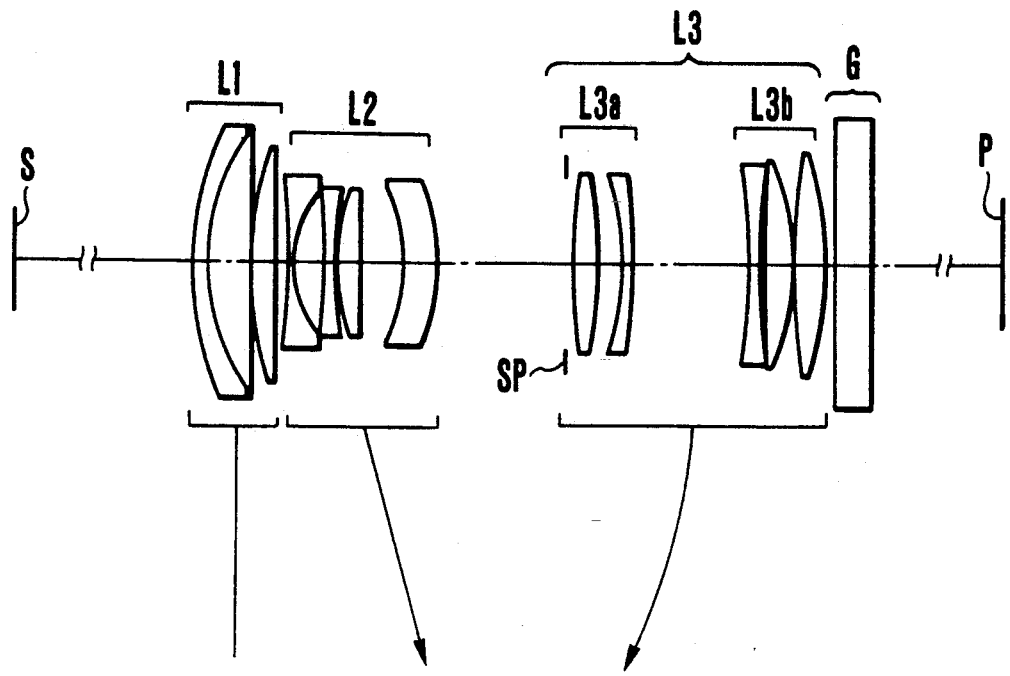
FIG. 1 is a sectional view of a numerical example 1 of a zoom lens of the invention.
Figure 2:
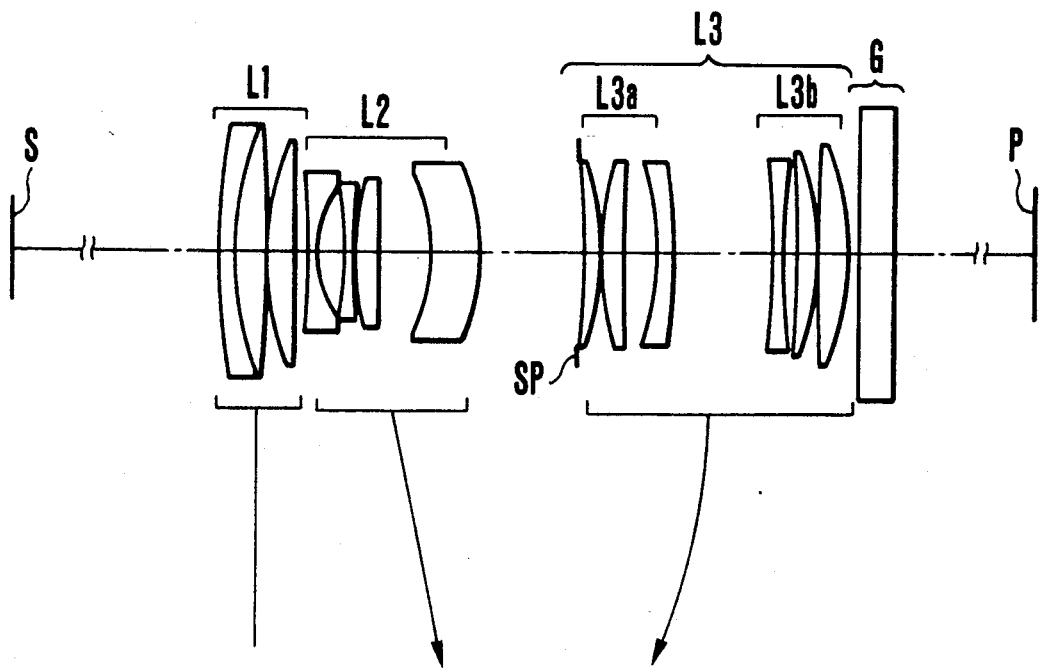
FIG. 2 is a sectional view of a numerical example 2 of a zoom lens of the invention.
Figure 3:
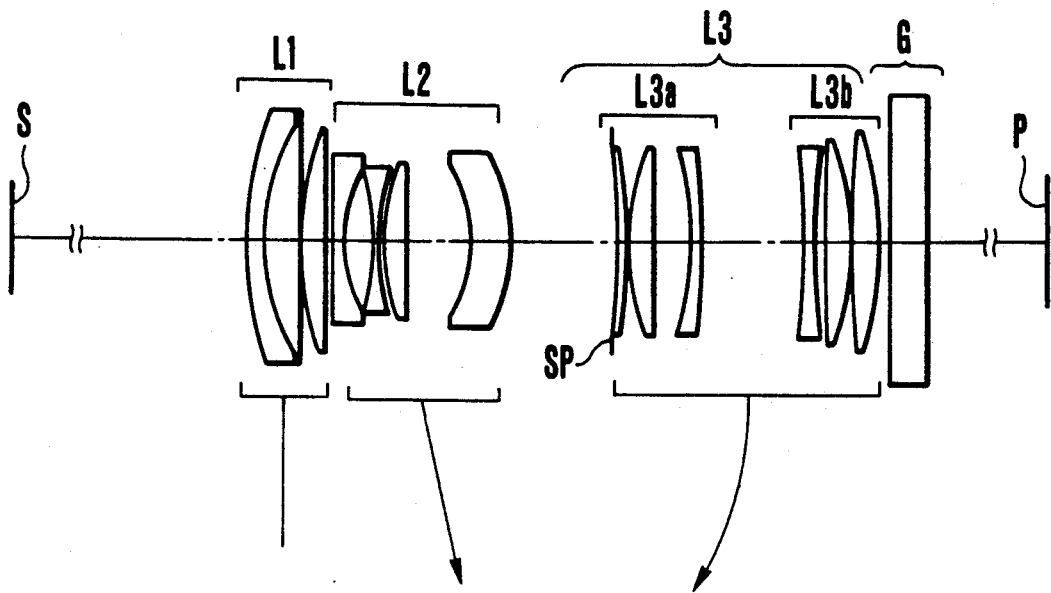
FIG. 3 is a sectional view of a numerical example 3 of a zoom lens of the invention.
Figure 4:
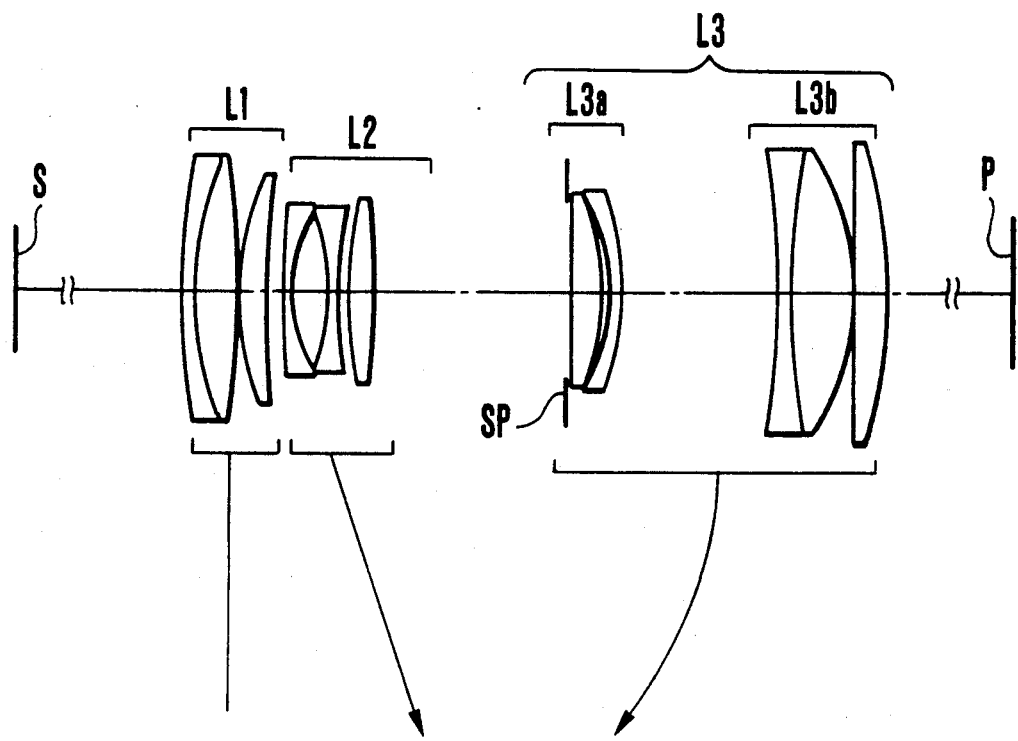
FIG. 4 is a sectional view of a numerical example 4 of a zoom lens of the invention.
Figure 5:
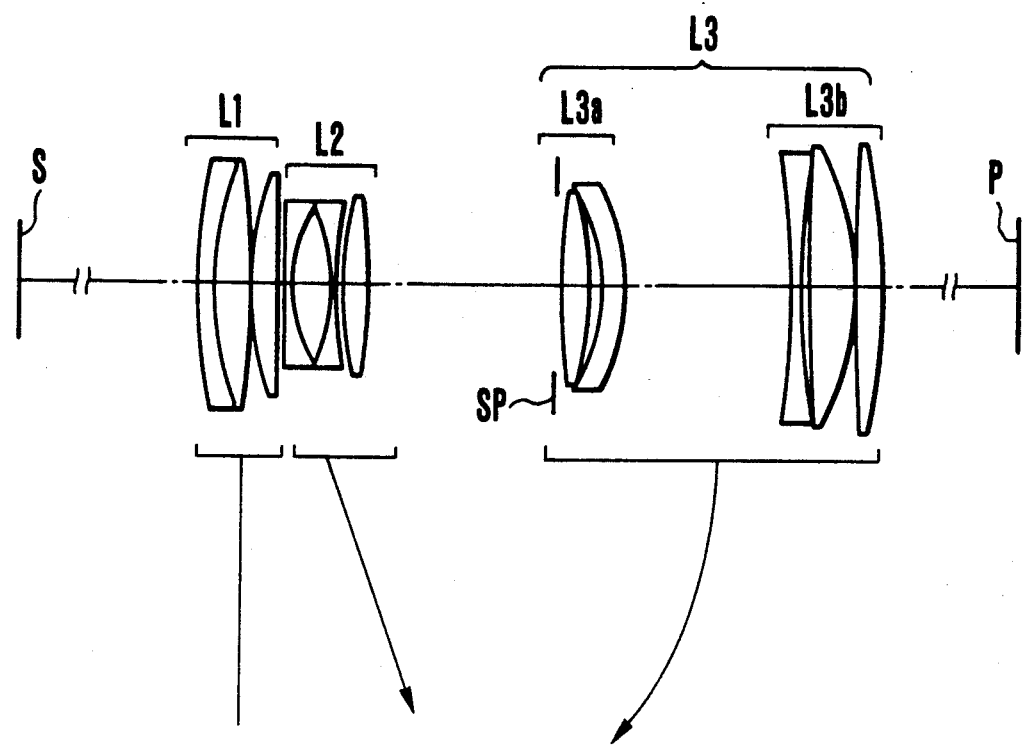
FIG. 5 is a sectional view of a numerical example 5 of a zoom lens of the invention.
Figure 6:
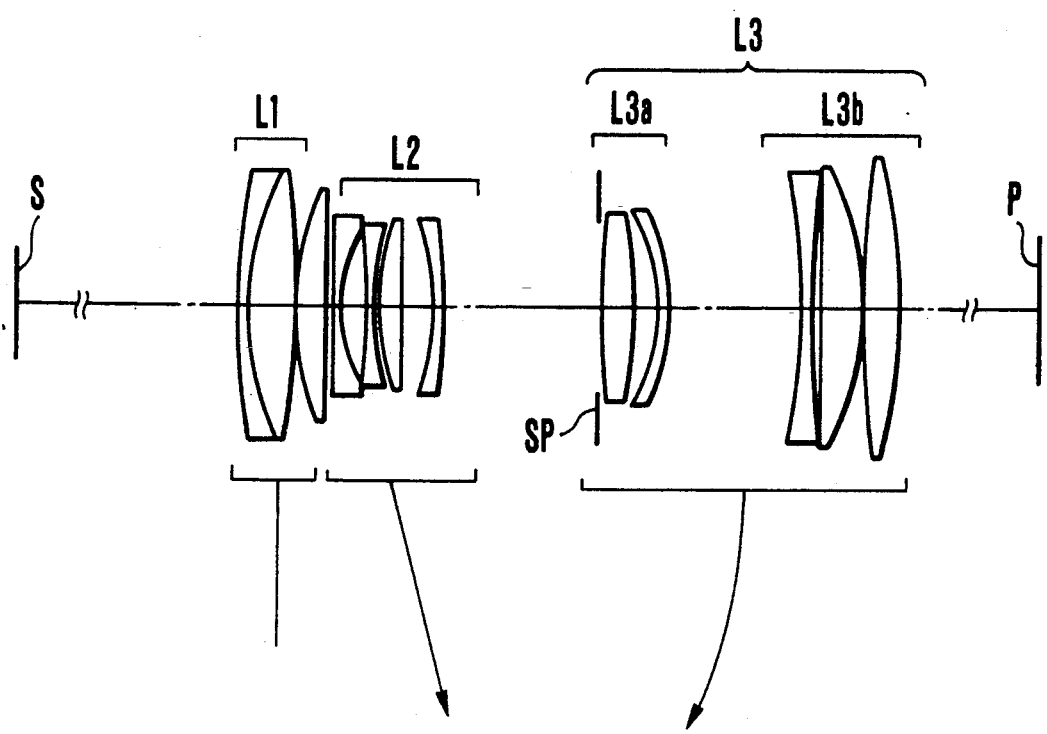
FIG. 6 is a sectional view of a numerical example 6 of a zoom lens of the invention.
Figure 7:
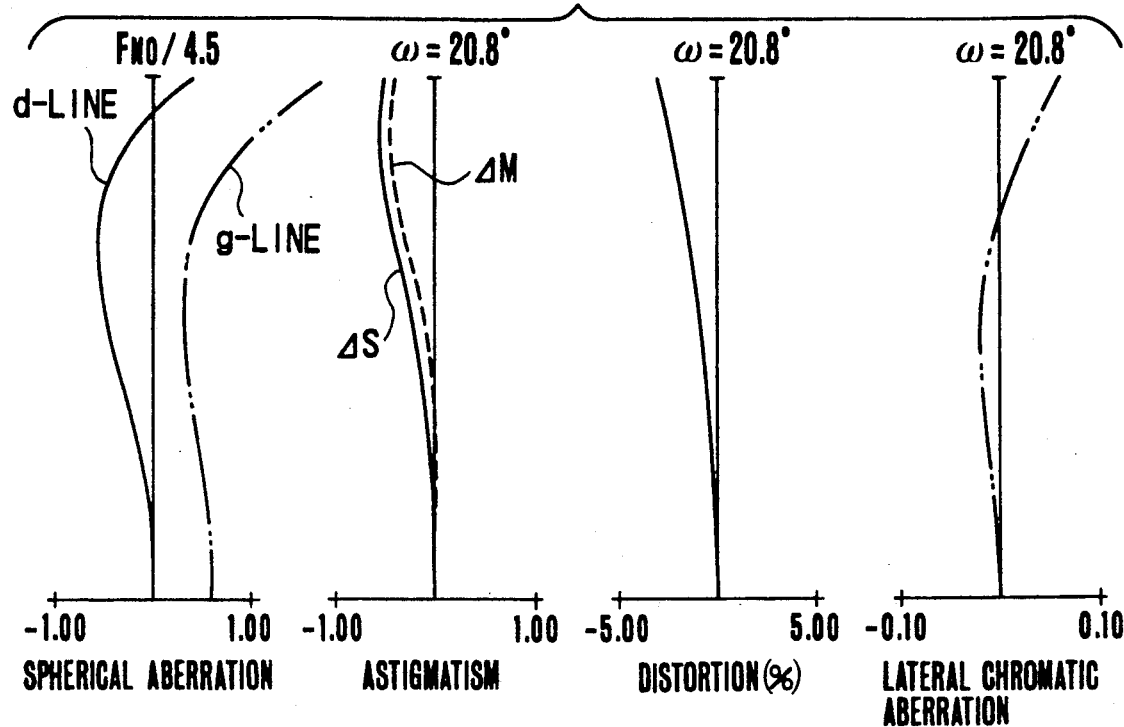
FIG. 7 shows graphs of the aberrations in the wide-angle end of the numerical example 1 of the invention.
Figure 8:
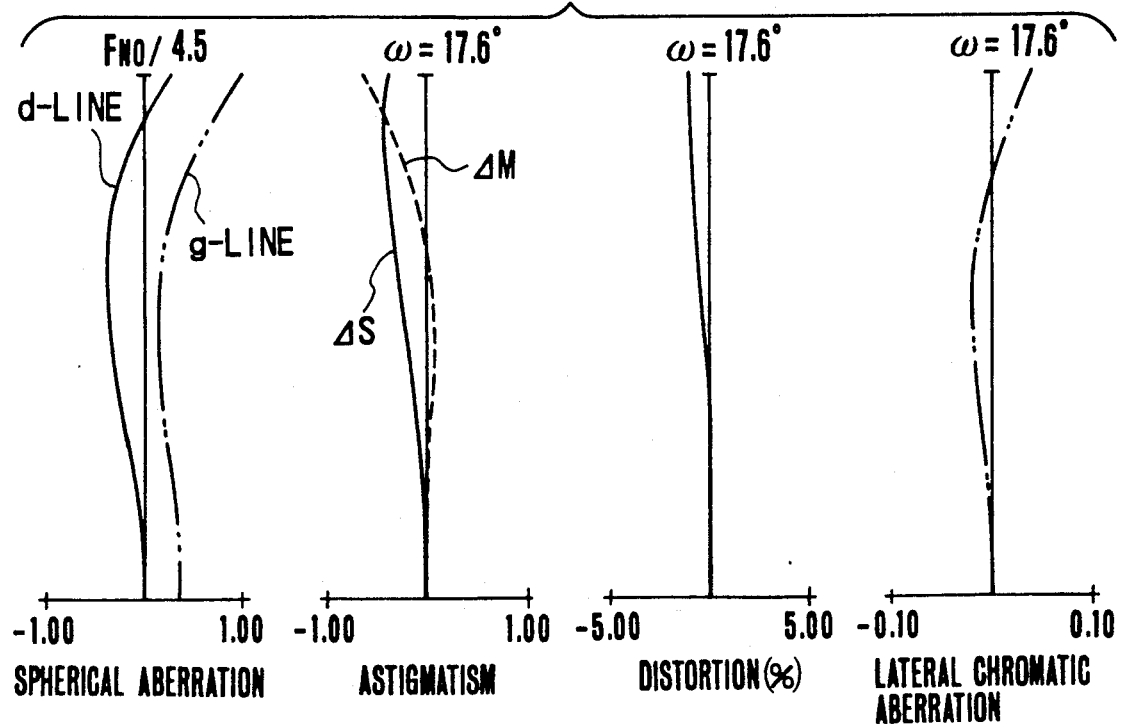
FIG. 8 shows graphs of the aberrations in an intermediate position of the numerical example 1 of the invention.
Figure 9:
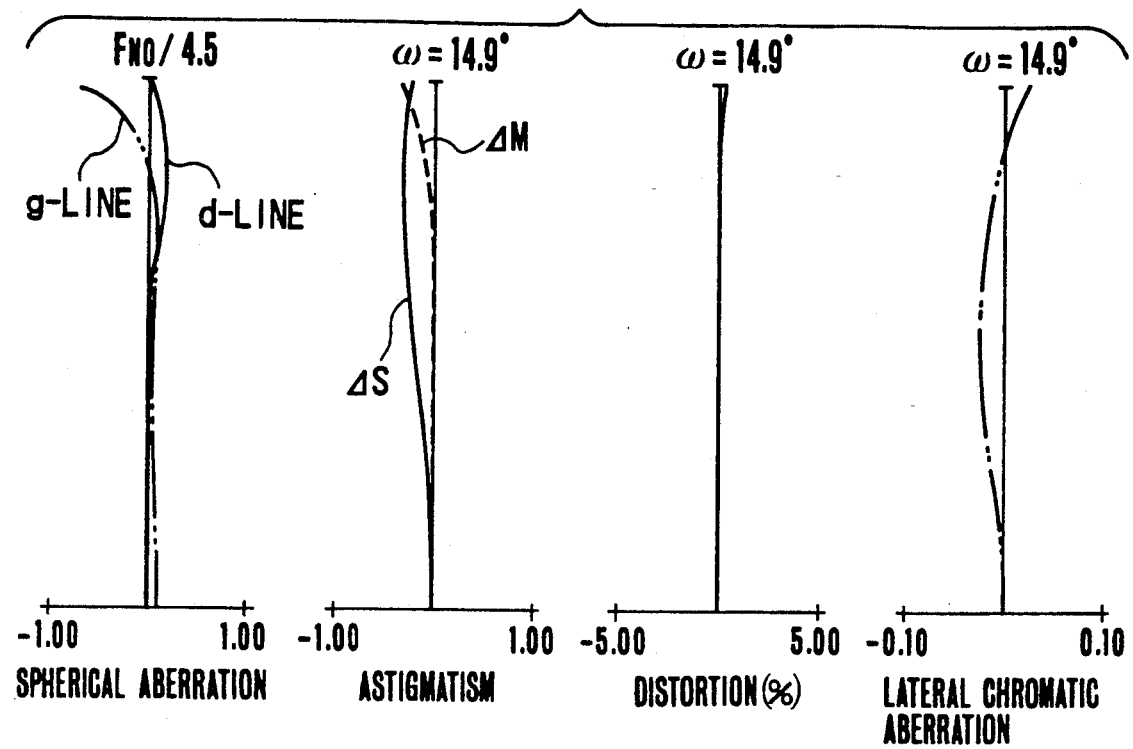
FIG. 9 shows graphs of the aberrations in the telephoto end of the numerical example 1 of the invention.
Figure 10:
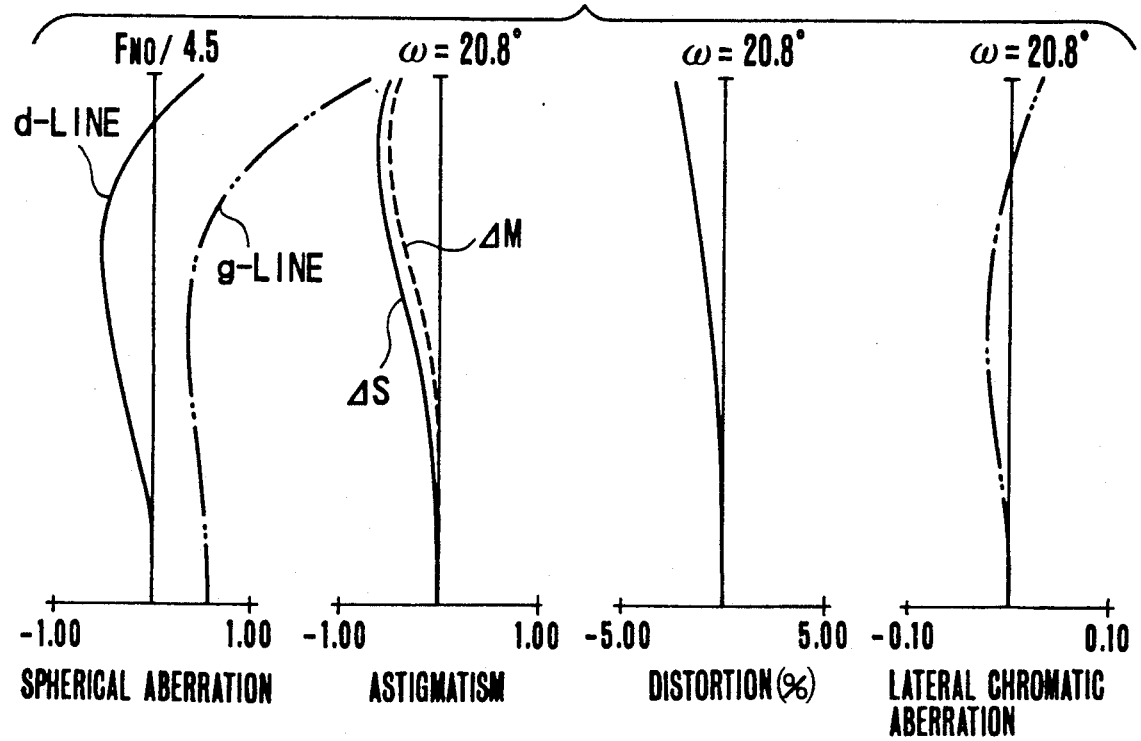
FIG. 10 shows graphs of the aberrations in the wide-angle end of the numerical example 2 of the invention.
Figure 11:
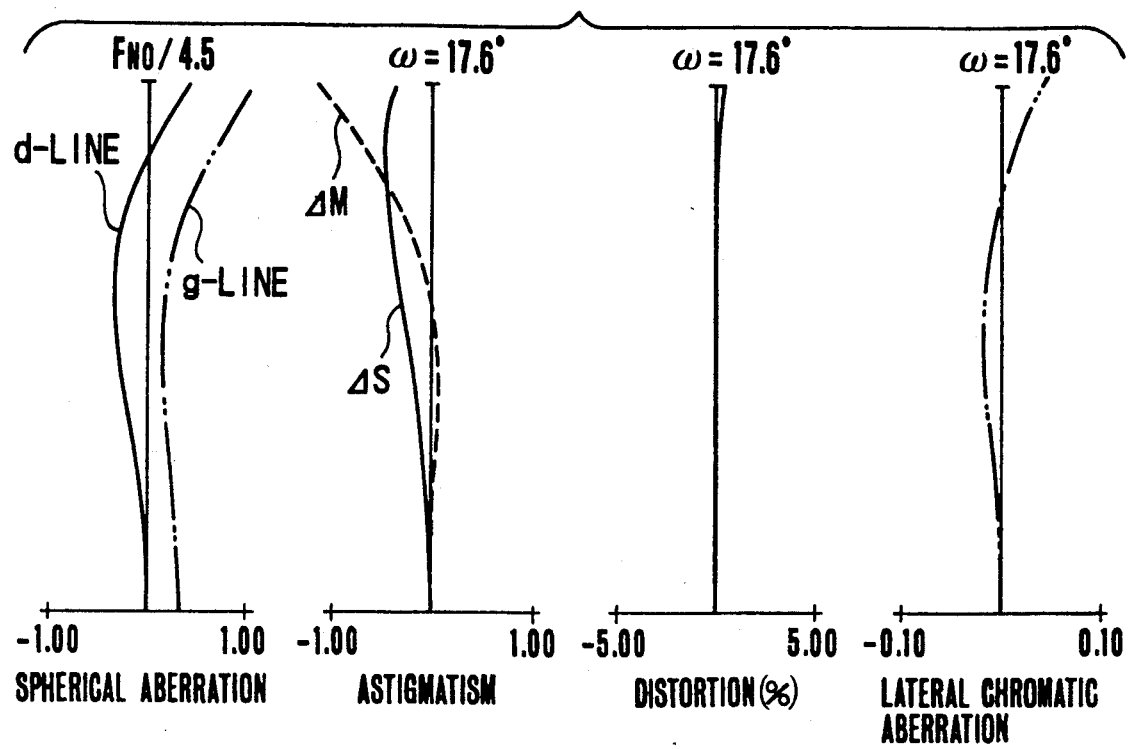
FIG. 11 shows graphs of the aberrations in an intermediate position of the numerical example 2 of the invention.
Figure 12:
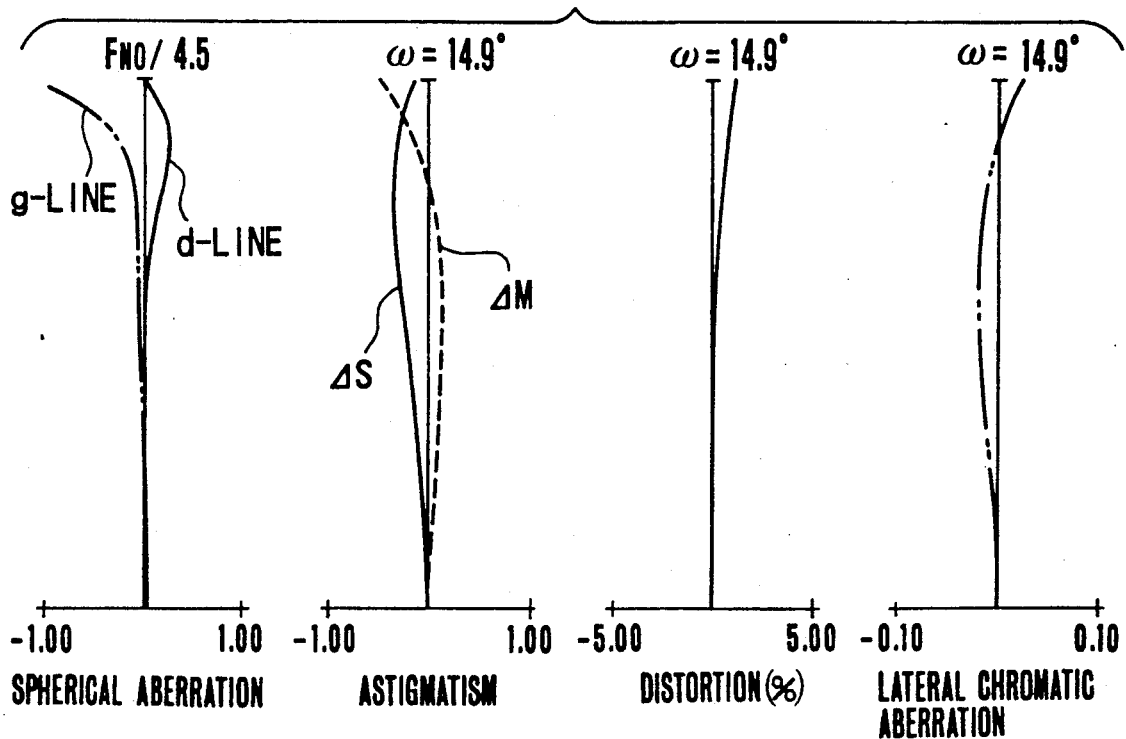
FIG. 12 shows graphs of the aberrations in the telephoto end of the numerical example 2 of the invention.
Figure 13:
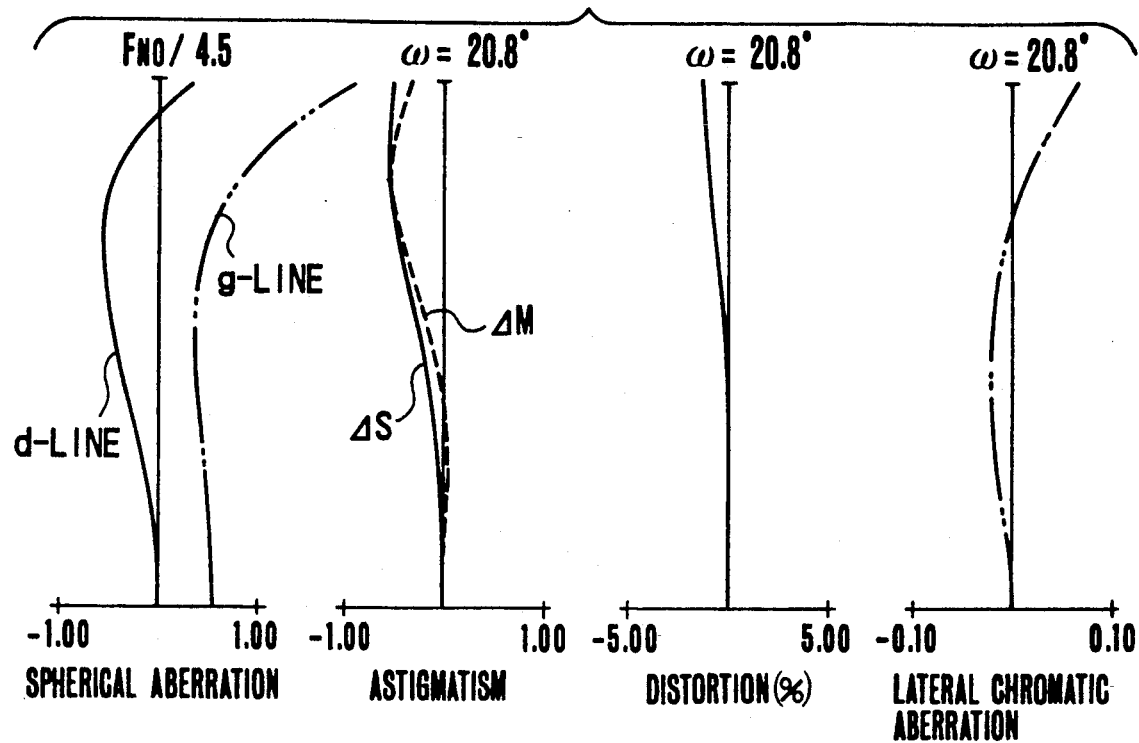
FIG. 13 shows graphs of the aberrations in the wide-angle end of the numerical example 3 of the invention.
Figure 14:
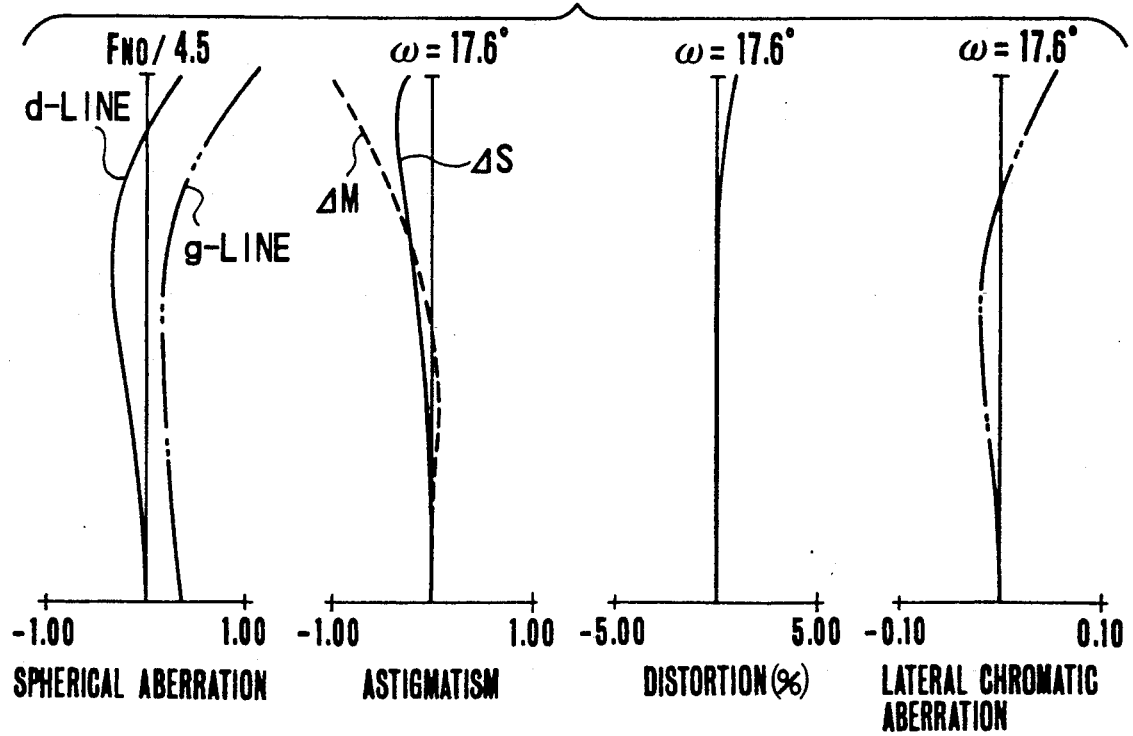
FIG. 14 shows graphs of the aberrations in an intermediate position of the numerical example 3 of the invention.
Figure 15:
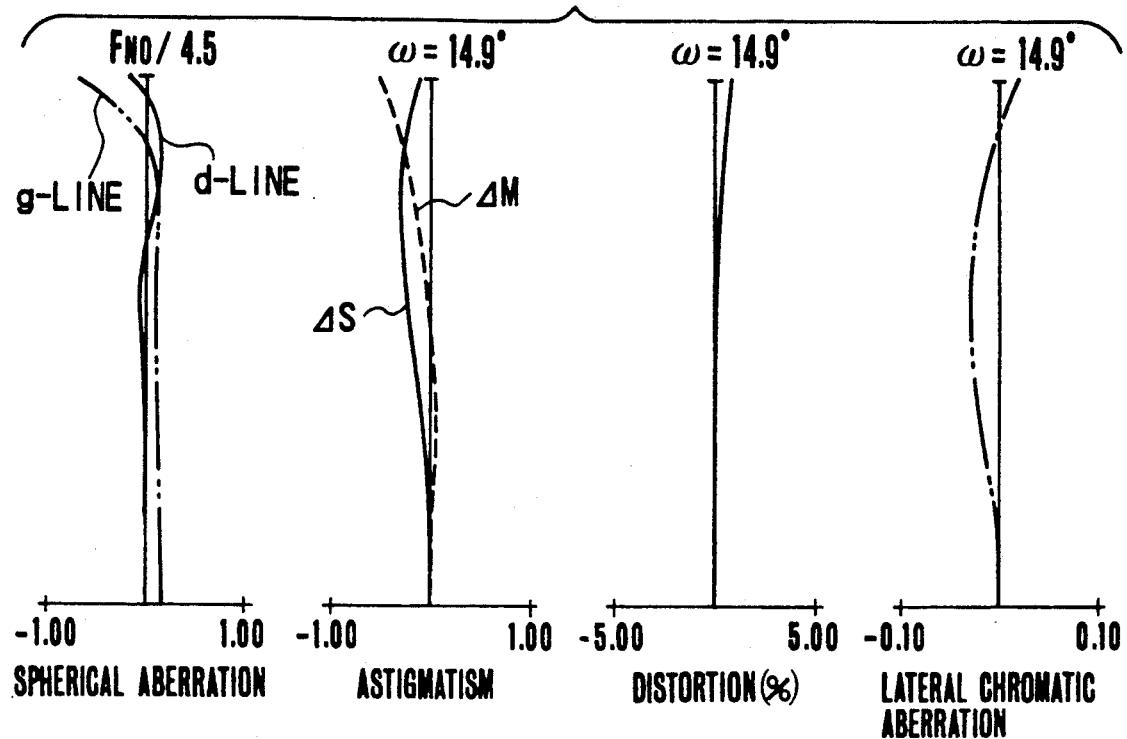
FIG. 15 shows graphs of the aberrations in the telephoto end of the numerical example 3 of the invention.
Figure 16:
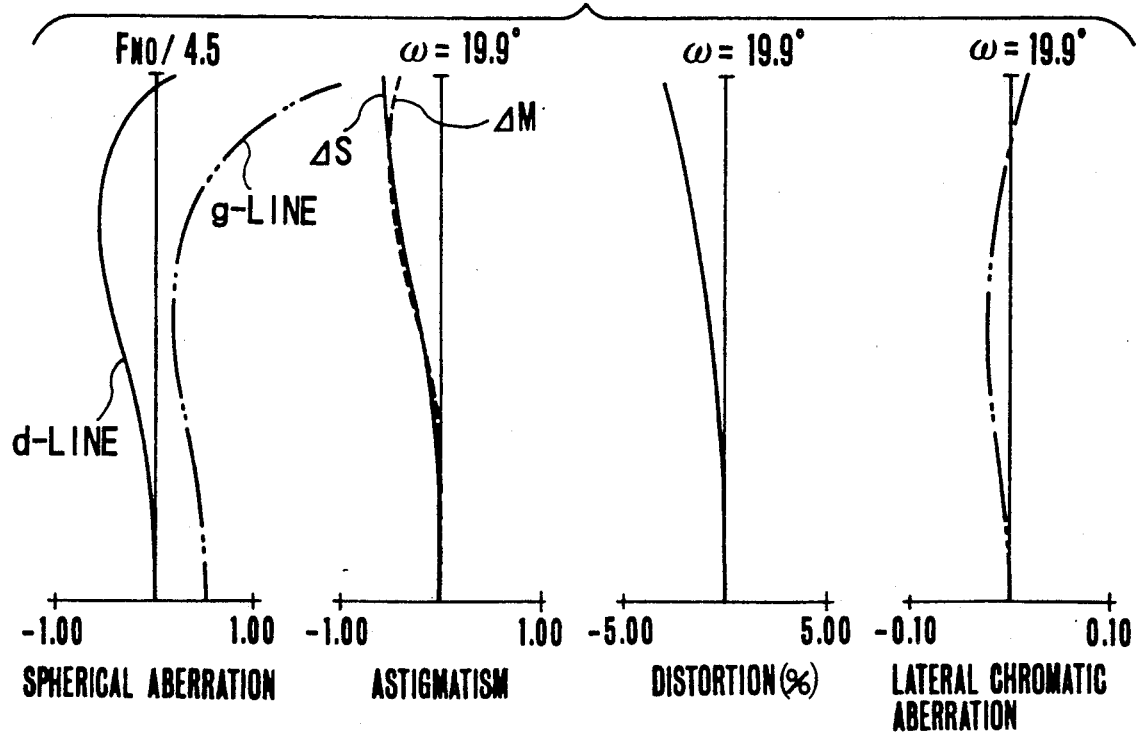
FIG. 16 shows graphs of the aberrations in the wide-angle end of the numerical example 4 of the invention.
Figure 17:
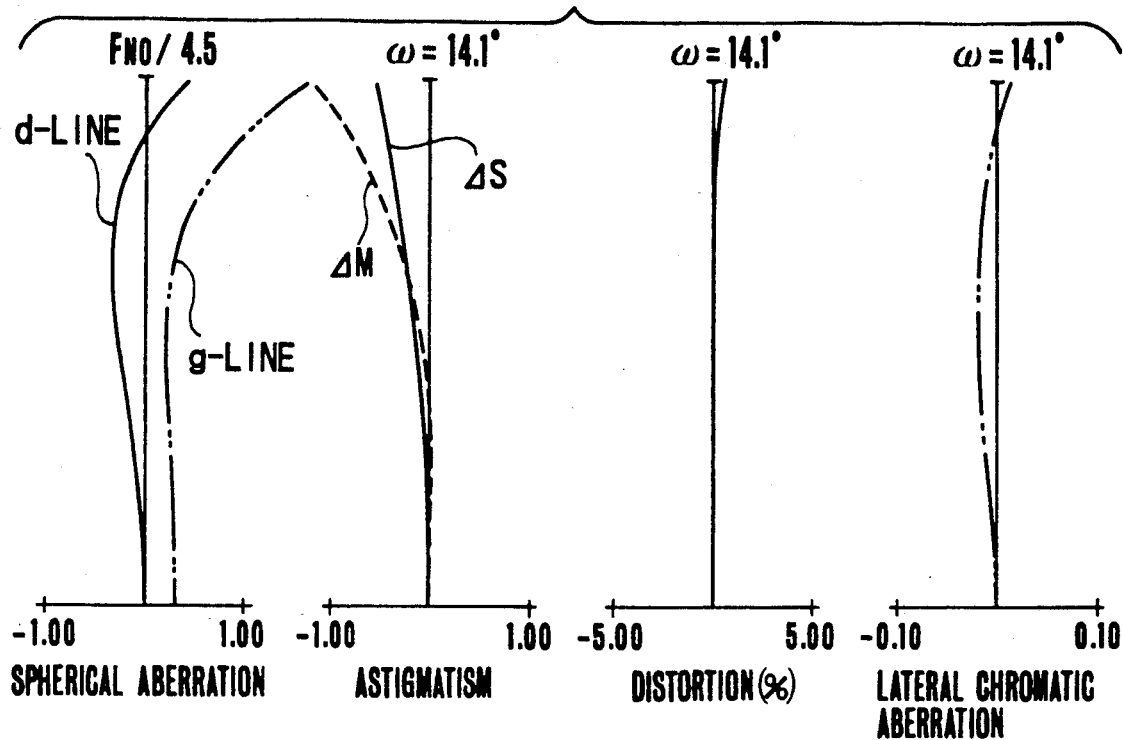
FIG. 17 shows graphs of the aberrations in an intermediate position of the numerical example 4 of the invention.
Figure 18:
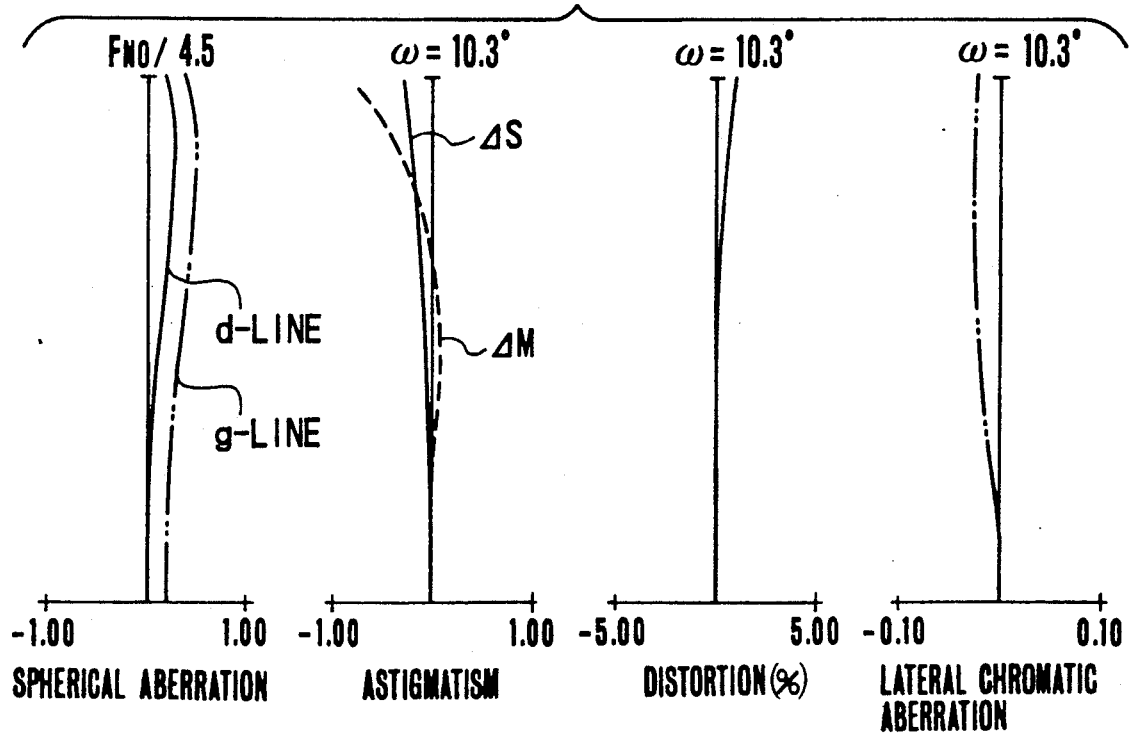
FIG. 18 shows graphs of the aberrations in the telephoto end of the numerical example 4 of the invention.
Figure 19:
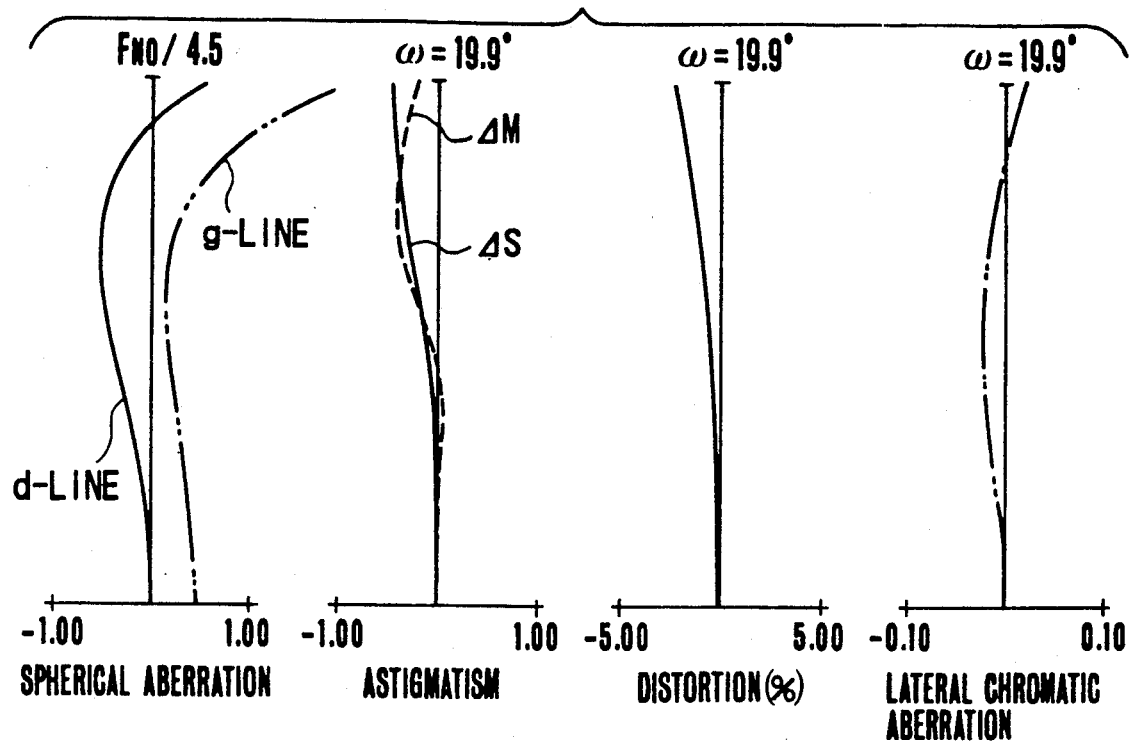
FIG. 19 shows graphs of the aberrations in the wide-angle end of the numerical example 5 of the invention.
Figure 20:
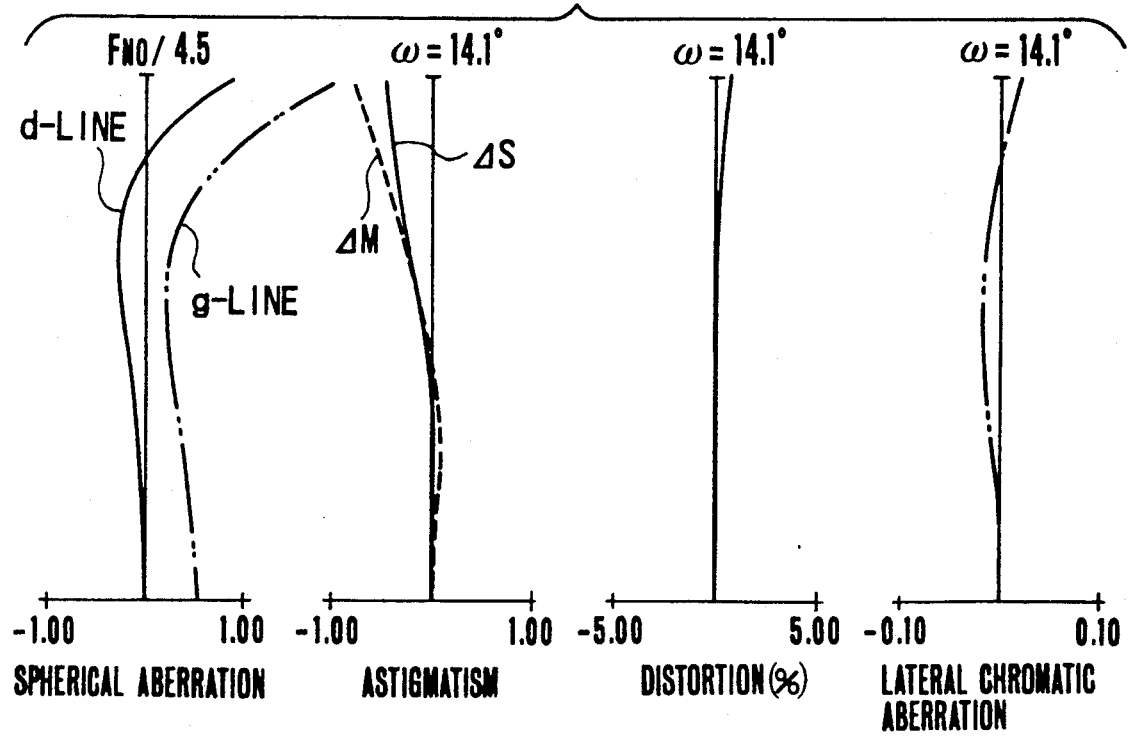
FIG. 20 shows graphs of the aberrations in an intermediate position of the numerical example 5 of the invention.
Figure 21:
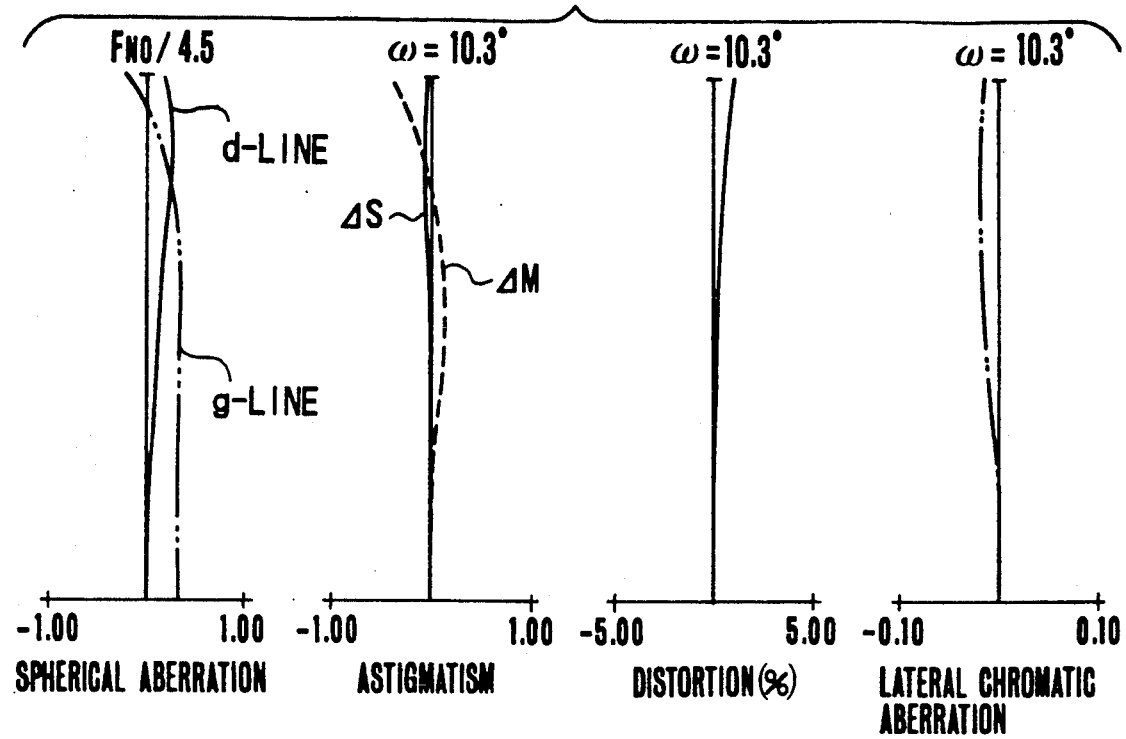
FIG. 21 shows graphs of the aberrations in the telephoto end of the numerical example 5 of the invention.
Figure 22:
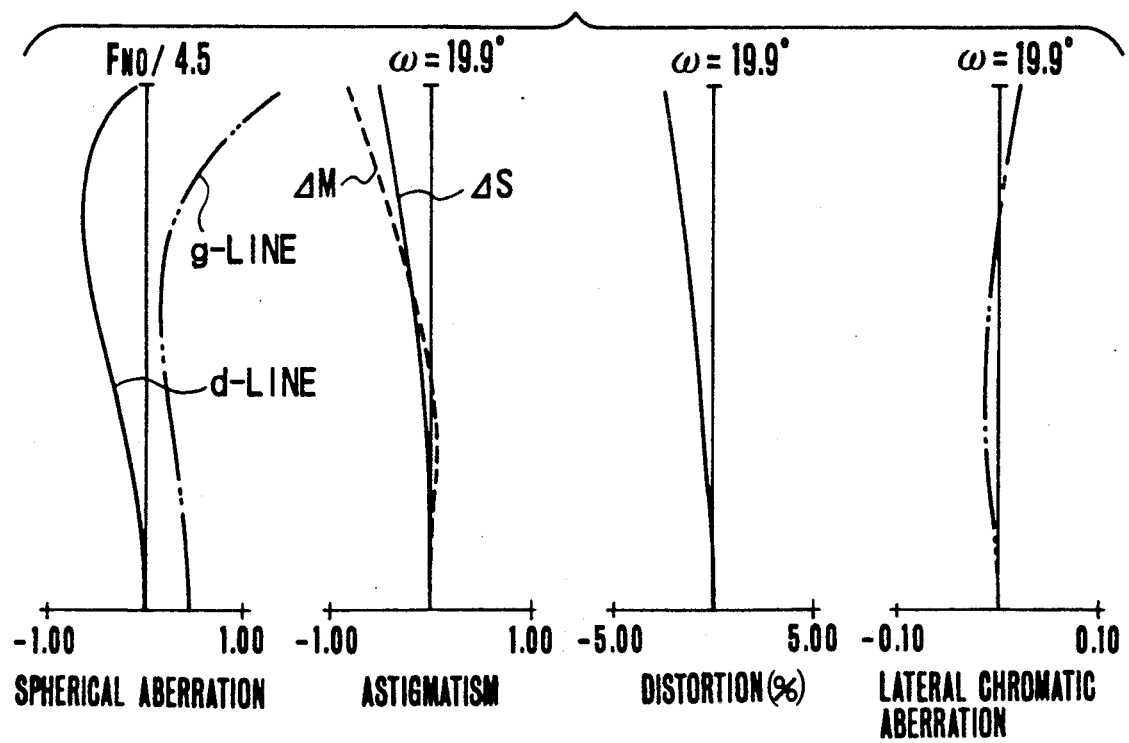
FIG. 22 shows graphs of the aberrations in the wide-angle end of the numerical example 6 of the invention.
Figure 23:
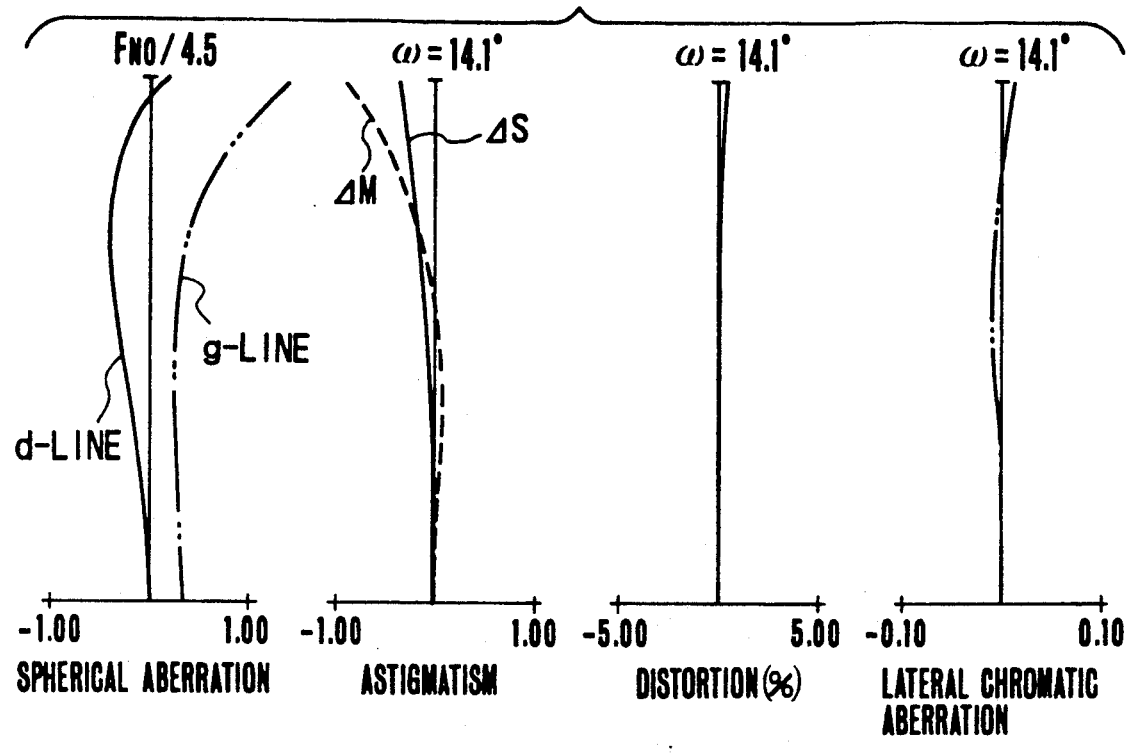
FIG. 23 shows graphs of the aberrations in an intermediate position of the numerical example 6 of the invention.
Figure 24:
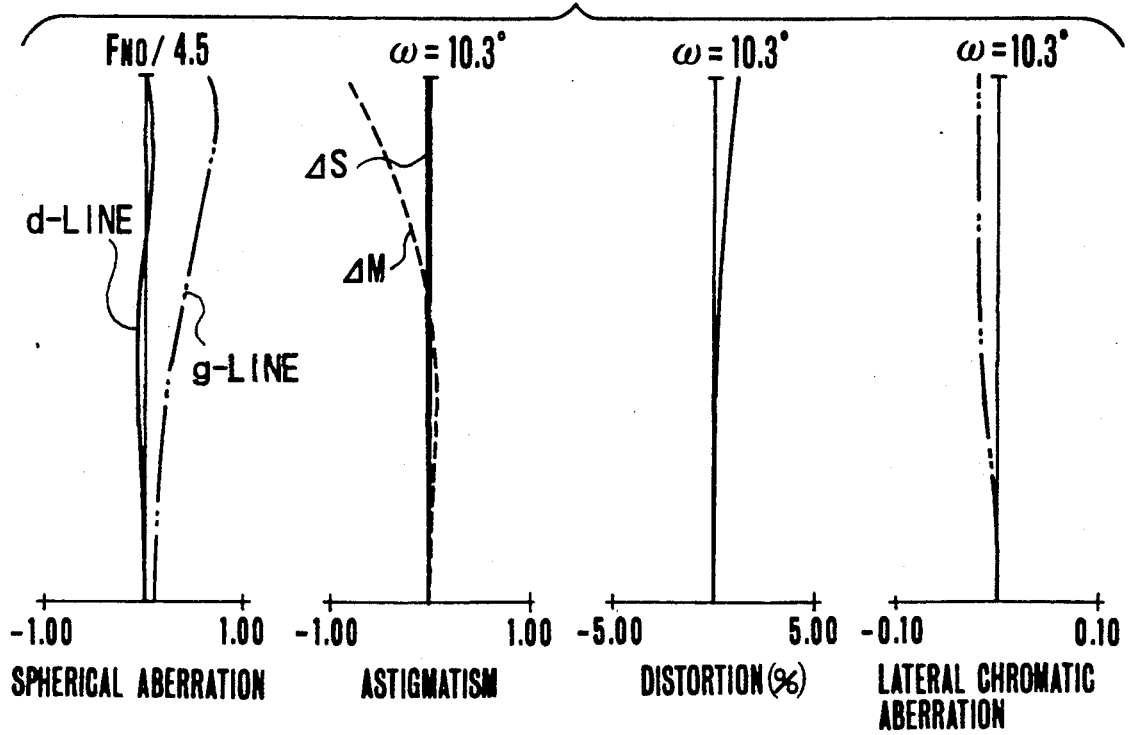
FIG. 24 shows graphs of the aberrations in the telephoto end of the numerical example 6 of the invention.

In the lens block diagrams of FIGS. 1 to 6, reference character L1 denotes a first lens unit of positive refractive power, L2 a second lens unit of negative refractive power and L3 a third lens unit of positive refractive power. The third lens unit L3 is composed of two lens sub-units, i.e., a front lens sub-unit L3a and a rear lens sub-unit L3b, with a boundary therebetween formed by a longest air separation. Reference character S denotes a screen (Projected plane), and P denotes an original picture on the color liquid crystal display (plane to project). Reference character G denotes an optical member which is equivalent to a cool layer for cooling the liquid crystal display.

The screen S and the original picture P are in a conjugate relation. In general, the screen S corresponds to a conjugate point at a longer distance (first conjugate point), while the original picture P corresponds to a conjugate point at a shorter distance (second conjugate point).

Zooming from the wide-angle end to the telephoto end is performed by moving the second lens unit L2 toward the original picture P and the third lens unit L3 toward the screen S as shown by arrows so as to increase an air separation between the first and second lens units and to decrease an air separation between the second and third lens units. Focusing is performed by moving the first lens unit. In addition, letting the image magnifications for an infinitely distant object of the second and third lens units in the wide-angle end be denoted by $\beta_{2w}$ and $\beta_{3w}$, respectively, the focal length of the second lens unit by f2, an interval between the principal points of the second and third lens units in the wide-angle end by $e_{2w}$, and the shortest focal length of the entire lens system by fw, the following conditions are satisfied.

$$1 < -\beta_{3w} < 1.5 \quad (1)$$

$$0.8 < -\beta_{2w} < 1.2 \quad (2)$$

$$0.25 < -f_2/f_w < 0.45 \quad (3)$$

$$0.7 < e_{2w}/f_w < 1.1 \quad (4)$$

In the present embodiment, a lens unit of positive refractive power is positioned on the side of the first conjugate point, as three lens units are used with the arrangement of the positive, negative and positive refractive powers. Further, the first to third lens units are designed so as to satisfy the conditions (1) to (4). These conditions are intended to fulfill the requirements of increasing the maximum angular coverage and of simplifying the lens system and also the requirements of increasing the distance from the third lens unit to the second conjugate point P, i.e., the back focal distance, and of obtaining a good optical performance over the entire range of magnifications of the order of 2 in zoom ratio.

In more detail, in the present embodiment, the zoom lens is constructed, as described above, from the first lens unit L1, when counted from the side of the first conjugate point S, of positive refractive power, the second lens unit L2 of negative refractive power and the third lens unit of positive refractive power, the second lens unit being moved toward the second conjugate point P either linearly or non-linearly, while the third lens unit is simultaneously moved toward the first conjugate point S as shown by the arrow, during zooming from the wide-angle end to the telephoto end. Incidentally, the first lens unit remains stationary during zooming. The back focal distance becomes shortest when the zoom lens is in the wide-angle end. However, to allow the zoom lens to be used as, for example, a projection lens for the color-liquid-crystal projection television system, even the shortest back focal distance is made to suffice for accommodating the dichroic mirrors, the reflection mirrors and other optical members therein.

The technical significance of each of the above-described conditions is explained below.

Now, assuming that the zoom lens is a thin lens system, the following equation is obtained:

$$S_w = (1 - \beta_{3w}) \cdot f_3 \quad \text{(a)}$$

where fi is the focal length of the i-th lens unit, $\beta iw$ is the image magnification of the i-th lens unit in the wide-angle end, and fw and Sw are respectively the focal length and the back focal distance of the entire lens system in the wide-angle end. As is apparent from the equation (a), in order to increase the back focal distance Sw, either measure may be taken such that the image magnification $\beta 3w$ of the third lens unit is made small, or that the focal length f3 is made long.

The use of the long focal length f3, however, brings the focus position on the side of the first conjugate point of the third lens unit far away from the original picture P toward the screen S. Hence, the total length of the entire lens system is increased objectionably.

For this reason, in the present invention, the image magnification $\beta 3w$ of the third lens unit in the wide-angle end is made more than at least unity ($\beta 3w < -1$), as determined to satisfy the condition (1). Thus, the long back focal distance can be obtained.

When the lower limit of the condition (1) is exceeded, the back focal distance in the wide-angle end becomes too short. When the upper limit of the condition (1) is exceeded, the image magnification $\beta 2w$ of the second lens unit tends to become a contraction system to a large extent, so that the back focal distance becomes shorter when on the telephoto side than when on the wide-angle side, and this is no good.

Meanwhile, the following formulae are established:

$$fw = f1 \cdot \beta 2w \cdot \beta 3w$$

$$\beta 2w = f1/(fw \cdot \beta 3w)$$

Figure 25:
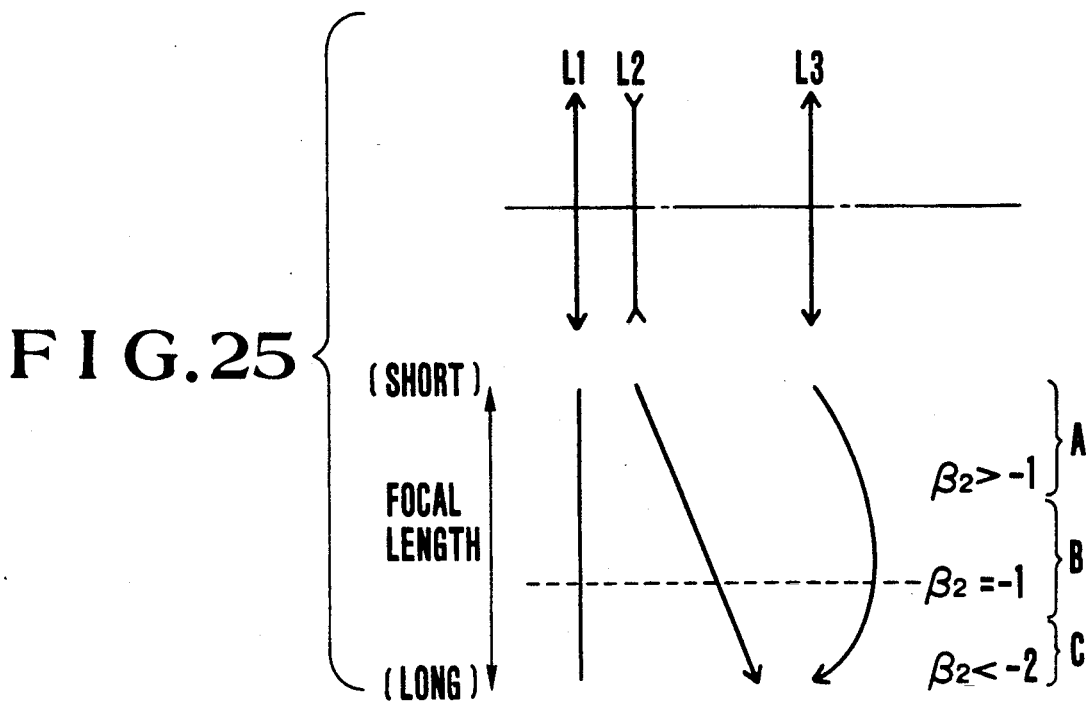
FIG. 25 is a diagram for explaining the paraxial refractive power arrangement of the zoom lens of the invention

For this reason, in a case where the image magnification $\beta 3w$ is far larger than unity, the image magnification $\beta 2w$ is liable to become contraction. If, as zooming approaches the wide-angle end, the image magnification $\beta 2w$ becomes contraction ($\beta 2w < -1$), zooming in the wide-angle region takes its place in a zooming zone A, as shown in FIG. 25.

In that case, the third lens unit must move toward the second conjugate point during zooming from the wide-angle end to the telephoto end. This results in a decrease in the back focal distance, objectionably. For this reason, in the present invention, the image magnification $\beta 2w$ of the second lens unit is made to be at or near unity, as satisfying the condition (2). In other words, the paraxial refractive power arrangement is determined so as to fall in a zooming zone B shown in FIG. 25.

When the lower limit of the condition (2) is exceeded, the back focal distance becomes short when on the telephoto side. When the upper limit of the condition (2) is exceeded, the shortest focal length fw of the entire lens system becomes too long, causing the projection magnification of the entire lens system to lower objectionably.

When the refractive power of the second lens unit is too strong as exceeding the lower limit of the condition (3), over-correction of field curvature results. Large negative distortion, too, is produced on the side of the second conjugate point. Such distortion becomes difficult to correct well, particularly, on the wide-angle side.

When the refractive power of the second lens unit is too weak as exceeding the upper limit of the condition (3), the zooming movement of the second lens unit increases largely. So, it becomes difficult to obtain a predetermined zoom ratio.

When the air separation between the second and third lens units in the wide-angle end is shorter as exceeding the lower limit of the condition (4), the range of movement of the second lens unit becomes narrow, so that it becomes difficult to obtain a predetermined zoom ratio by using the second lens unit serving to vary the focal length. When the air separation is too wide as exceeding the upper limit, the diameter of the front lens units (first and second lens units) increases objectionably.

The zoom lens according to the invention can be achieved by satisfying all the foregoing conditions. However, in order to correct lateral chromatic aberration and other various aberrations, while securing a sufficient back focal distance, for high optical performance over the entire zooming range, it is preferable to satisfy the following additional conditions (i) to (iv).

(i) The third lens unit has two lens sub-units, i.e., in order from the side of the first conjugate point, a front lens sub-unit and a rear lens sub-unit with a boundary therebetween formed by a longest air separation, and the rear lens sub-unit has at least one negative lens and at least one positive lens 32P, satisfying the following condition:

$$\theta 32P - (0.6438 - 0.001682\nu 32P) > 0.02 \quad (5)$$

where $\nu 32P$ and $\theta 32P$ are respectively the Abbe number and the extraordinary dispersion ratio of the material of the positive lens 32P.

Alternatively, as the rear lens sub-unit has at least one negative lens 32N, the following condition is satisfied:

$$\theta 32N - (0.6438 - 0.001682\nu 32N) < -0.003 \quad (6)$$

where $\nu 32N$ and $\theta 32N$ are respective the Abbe number and the extraordinary dispersion ratio of the material of the negative lens 32N.

Incidentally, the extraordinary dispersion ratio used here is defined by the following formula:

$$\theta = (n_g - n_F)/(n_F - n_C)$$

where $n_g$, $n_F$ and $n_C$ are the refractive indices for the g, F and C lines of the material, respectively.

The condition (5) or (6) has an aim to correct lateral chromatic aberration.

In the invention, the lateral chromatic aberration is corrected by using an extraordinary dispersion glass in at least one of the lenses in the rear lens sub-unit having an off-axial principal ray entering at a large height. In other words, the lateral chromatic aberration is well corrected by using the material whose refractive index change for the g line is larger than that of the ordinary glass in the aforesaid positive lens 32P of the rear lens sub-unit, or by using the material whose refractive index change for the g line is smaller than that of the ordinary glass in the aforesaid negative lens 32N. When the condition (5) or (-6) is violated, it becomes difficult to correct the lateral chromatic aberration.

(ii) The second lens unit includes, in order from the side of the first conjugate point, a negative lens, a negative lens, a positive lens and a negative lens 22N of meniscus form convex toward the second conjugate point. By this arrangement, as the focal length is varied by the second lens unit, variation of aberrations with zooming is well corrected. Thus, a high optical performance throughout the entire zooming range is obtained.

(iii) Letting the radii of curvature of the lens surfaces of the first and second conjugate point sides of the aforesaid negative lens 22N constituting part of the second lens unit be denoted by R22NF and R22NR, respectively, and the lens thickness of the negative lens 22N by D22N, the following conditions are satisfied:

$$-20 < (R22NF + R22NR)/(R22NF = R22NR) < -6 \quad (7)$$

$$0.04 < D22N/fw < 0.12 \quad (8)$$

The conditions (7) and (8) properly set the lens shape (lens factor) and lens thickness of the negative lens 22N constituting part of the second lens unit and have an aim chiefly to correct distortion well.

Figure 26A:
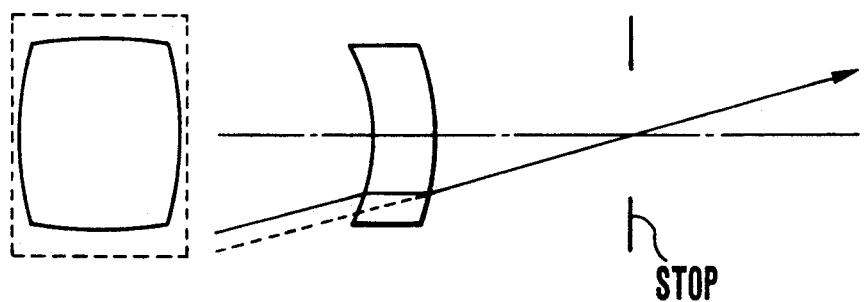
FIGS. 26(A) and 26(B) are diagrams for explaining part of the zoom lens of the invention.
Figure 26B:
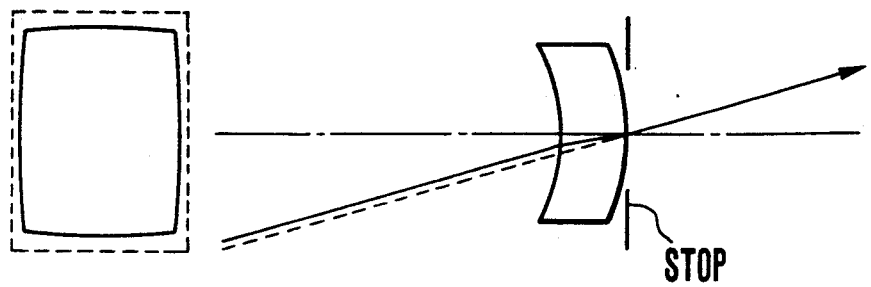
Figure 27:
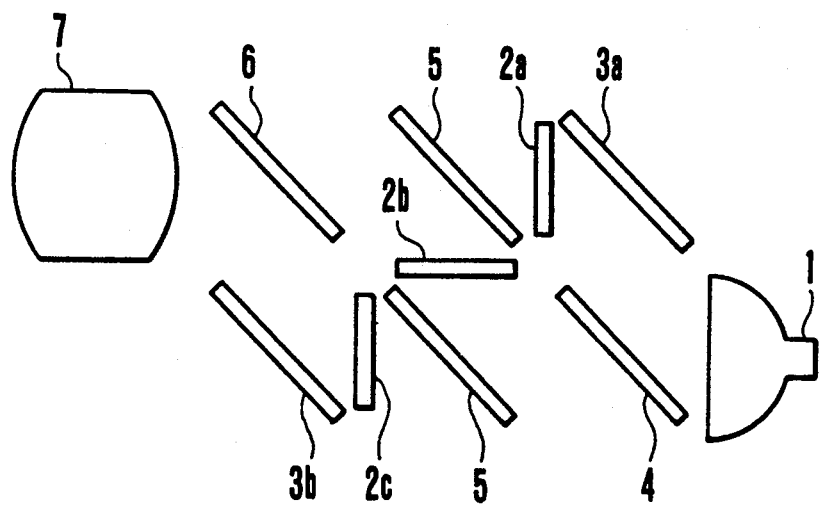
FIG. 27 is a diagram showing the construction and arrangements of the parts of the conventional color-liquid-crystal projector.

In the invention, on the side of the second conjugate point in the second lens unit, there is arranged the negative lens 22N of meniscus form convex toward the second conjugate point. This permits good correction of the negative distortion on the side of the second conjugate point in the wide-angle end at which the height of incidence of the off-axial principal ray on the second lens unit is high, as shown in FIGS. 26(A) and 26(B).

When the lower limit of the condition (7) is exceeded, the refractive power of the negative lens 22N is too weak, so that the refractive powers of the other negative lenses in the second lens unit have to be so much strengthened. As a result, it becomes difficult to correct the various aberrations well. When the upper limit is exceeded, the lens shape is flat or even concave, so that it becomes difficult to correct the distortion.

When the negative lens 22N is too thin as exceeding the lower limit of the condition (8), it becomes difficult to correct the distortion. When the negative lens 22N is too thick as exceeding the upper limit, the range of movement of the second lens unit is narrow, so that it becomes difficult to obtain a predetermined zoom ratio.

(iv) The front lens sub-unit of the third lens unit includes a positive lens 31P and a negative lens 31N of meniscus form convex toward the second conjugate point, satisfying the following conditions:

$$-0.5 < (R31PF + R31PR)/(R31PF - R31PR)1.3 \quad (9)$$

$$-15 < (R31NF + R31NR)/(R31NF - R31NR) < \quad (10)$$

where R31PF and R31PR are respectively the radii of curvature of the lens surfaces of the first and second conjugate point sides of the positive lens 31P, and R31NF and R31NR are respectively the radii of curvature of the lens surfaces of the first and second conjugate point sides of the negative lens 31N.

The conditions (9) and (10) properly set the lens shapes of the two lenses of the front lens sub-unit and have an aim chiefly to correct variation of spherical aberration during zooming.

Even if either one of the upper and lower limits of the conditions (9) and (10) is exceeded, it becomes difficult to correct the spherical aberration.

Next, numerical examples 1 to 6 of the invention are shown. In the numerical data for the examples 1 to 6, Ri is the radius of curvature of the i-th lens surface, when counted from the screen side, Di is the i-th lens thickness or air separation, and Ni and νi are respectively the refractive index and Abbe number of the glass of the i-th lens, when counted from the screen side. Also, the relationships between the each of the above-described conditions (1) to (10) and the numerical values of the examples 1 to 6 are shown in Table-1.

Numerical Example 1 (FIGS. 1, 7, 8 and 9):
F = 217.12   FNO = 1:4.5   2ω = 41.6°-29.8°

| | | | |
|---|---|---|---|
| R 1 = 137.39 | D 1 = 6.65 | N 1 = 1.80518 | ν 1 = 25.4 |
| R 2 = 93.62 | D 2 = 17.40 | N 2 = 1.51633 | ν 2 = 64.1 |
| R 3 = 1018.72 | D 3 = 0.20 | | |
| R 4 = 170.60 | D 4 = 9.55 | N 3 = 1.51633 | ν 3 = 64.1 |
| R 5 = ∞ | D 5 = Variable | | |
| R 6 = −1182.18 | D 6 = 3.60 | N 4 = 1.60311 | ν 4 = 60.7 |
| R 7 = 55.99 | D 7 = 12.06 | | |
| R 8 = −193.57 | D 8 = 3.10 | N 5 = 1.69680 | ν 5 = 55.5 |
| R 9 = 159.90 | D 9 = 2.01 | | |
| R10 = 96.01 | D10 = 8.90 | N 6 = 1.74077 | ν 6 = 27.8 |
| R11 = 88499.31 | D11 = 17.02 | | |
| R12 = −81.48 | D12 = 13.80 | N 7 = 1.51633 | ν 7 = 64.1 |
| R13 = 96.42 | D13 = Variable | | |
| R14 = Stop | D14 = 2.00 | | |
| R15 = 190.63 | D15 = 10.30 | N 8 = 1.60311 | ν 8 = 60.7 |
| R16 = −217.99 | D16 = 9.87 | | |
| R17 = −120.40 | D17 = 4.00 | N 9 = 1.66998 | ν 9 = 39.3 |
| R18 = −370.90 | D18 = 46.64 | | |
| R19 = −326.66 | D19 = 4.20 | N10 = 1.83400 | ν10 = 37.2 |
| R20 = 326.66 | D20 = 2.54 | | |
| R21 = 5050.18 | D21 = 9.85 | N11 = 1.49700 | ν11 = 81.6 |
| R22 = −123.29 | D22 = 0.20 | | |
| R23 = 270.76 | D23 = 13.05 | N12 = 1.48749 | ν12 = 70.2 |
| R24 = −172.04 | D24 = 5.00 | | |
| R25 = ∞ | D25 = 15.00 | N13 = 1.51633 | ν13 = 64.1 |
| R26 = ∞ | | | |

| Variable Separation | Focal Length | | |
|---|---|---|---|
| | 217.12 | 259.64 | 310.56 |
| D 5 | 5.07 | 16.15 | 24.17 |
| D13 | 53.55 | 34.08 | 11.92 |

Numerical Example 2 (FIGS. 2, 10, 11 and 12):
F = 217.10   FNO = 1:4.5   2ω = 41.6°-29.8°

| | | | |
|---|---|---|---|
| R 1 = 300.45 | D 1 = 6.39 | N 1 = 1.80518 | ν 1 = 25.4 |
| R 2 = 152.05 | D 2 = 13.00 | N 2 = 1.51633 | ν 2 = 64.1 |
| R 3 = −791.66 | D 3 = 0.20 | | |
| R 4 = 129.95 | D 4 = 10.70 | N 3 = 1.51633 | ν 3 = 64.1 |
| R 5 = 7202.78 | D 5 = Variable | | |
| R 6 = −497.21 | D 6 = 3.79 | N 4 = 1.60311 | ν 4 = 60.7 |
| R 7 = 54.88 | D 7 = 10.49 | | |
| R 8 = −165.74 | D 8 = 2.93 | N 5 = 1.71299 | ν 5 = 53.8 |
| R 9 = 195.16 | D 9 = 1.53 | | |
| R10 = 97.14 | D10 = 10.00 | N 6 = 1.74077 | ν 6 = 27.8 |
| R11 = −1683.87 | D11 = 20.73 | | |
| R12 = −79.21 | D12 = 19.64 | N 7 = 1.51633 | ν 7 = 64.1 |
| R13 = −93.03 | D13 = Variable | | |
| R14 = Stop | D14 = 1.91 | | |
| R15 = −709.45 | D15 = 6.73 | N 8 = 1.48749 | ν 8 = 70.2 |
| R16 = −140.48 | D16 = 0.20 | | |
| R17 = 127.50 | D17 = 9.33 | N 9 = 1.48749 | ν 9 = 70.2 |
| R18 = 2692.93 | D18 = 13.50 | | |
| R19 = −133.00 | D19 = 6.22 | N10 = 1.83400 | ν10 = 37.2 |
| R20 = −292.10 | D20 = 40.00 | | |
| R21 = −386.93 | D21 = 3.97 | N11 = 1.83400 | ν11 = 37.2 |
| R22 = 320.77 | D22 = 5.42 | | |
| R23 = −1312.65 | D23 = 8.04 | N12 = 1.49700 | ν12 = 81.6 |
| R24 = −139.64 | D24 = 0.20 | | |
| R25 = 684.45 | D25 = 12.01 | N13 = 1.48749 | ν13 = 70.2 |
| R26 = −133.31 | D26 = 5.00 | | |
| R27 = ∞ | D27 = 15.00 | N14 = 1.51633 | ν14 = 64.1 |
| R28 = ∞ | | | |

| Variable Separation | Focal Length | | |
|---|---|---|---|
| | 217.10 | 260.51 | 310.45 |
| D 5 | 5.47 | 19.99 | 29.36 |
| D13 | 41.32 | 24.57 | 4.53 |

Numerical Example 3 (FIGS. 3, 13, 14 and 15):
F = 217.03   FNO = 1:4.5   2ω = 41.6°-29.8°

| | | | |
|---|---|---|---|
| R 1 = 154.69 | D 1 = 6.39 | N 1 = 1.80518 | ν 1 = 25.4 |
| R 2 = 100.96 | D 2 = 14.50 | N 2 = 1.51633 | ν 2 = 64.1 |
| R 3 = 7210.12 | D 3 = 0.20 | | |

-continued

| | | | |
|---|---|---|---|
| R 4 = 163.98 | D 4 = 9.20 | N 3 = 1.51633 | ν 3 = 64.1 |
| R 5 = 12842.22 | D 5 = Variable | | |
| R 6 = 3277.91 | D 6 = 3.59 | N 4 = 1.60311 | ν 4 = 60.7 |
| R 7 = 53.61 | D 7 = 12.18 | | |
| R 8 = −147.15 | D 8 = 2.99 | N 5 = 1.69680 | ν 5 = 55.5 |
| R 9 = 177.24 | D 9 = 1.88 | | |
| R10 = 97.41 | D10 = 10.00 | N 6 = 1.72825 | ν 6 = 28.5 |
| R11 = −1165.87 | D11 = 26.15 | | |
| R12 = −64.07 | D12 = 15.81 | N 7 = 1.51633 | ν 7 = 64.1 |
| R13 = −77.10 | D13 = Variable | | |
| R14 = Stop | D14 = 1.91 | | |
| R15 = −3240.04 | D15 = 5.54 | N 8 = 1.51633 | ν 8 = 64.1 |
| R16 = −244.27 | D16 = 0.20 | | |
| R17 = 133.83 | D17 = 8.47 | N 9 = 1.48749 | ν 9 = 70.2 |
| R18 = −3292.07 | D18 = 14.33 | | |
| R19 = −140.38 | D19 = 4.06 | N10 = 1.66446 | ν10 = 35.8 |
| R20 = −379.99 | D20 = 41.75 | | |
| R21 = −520.69 | D21 = 4.23 | N11 = 1.83400 | ν11 = 37.2 |
| R22 = 270.93 | D22 = 5.07 | | |
| R23 = 8466.96 | D23 = 9.10 | N12 = 1.49700 | ν12 = 81.6 |
| R24 = −139.75 | D24 = 0.20 | | |
| R25 = 411.31 | D25 = 11.68 | N13 = 1.48749 | ν13 = 70.2 |
| R26 = −158.47 | D26 = 5.00 | | |
| R27 = ∞ | D27 = 15.00 | N14 = 1.51633 | ν14 = 64.1 |
| R28 = ∞ | | | |

| Variable Separation | Focal Length | | |
|---|---|---|---|
| | 217.03 | 260.44 | 310.36 |
| D 5 | 3.01 | 16.09 | 24.83 |
| D13 | 41.37 | 23.52 | 2.92 |

Numerical Example 4 (FIGS. 4, 16, 17 and 18):
F = 106.83   FNO = 1:4.5   2ω = 39.8°–20.6°

| | | | |
|---|---|---|---|
| R 1 = 167.16 | D 1 = 2.80 | N 1 = 1.80518 | ν 1 = 25.4 |
| R 2 = 77.73 | D 2 = 8.40 | N 2 = 1.51633 | ν 2 = 64.1 |
| R 3 = −196.87 | D 3 = 0.20 | | |
| R 4 = 59.58 | D 4 = 6.00 | N 3 = 1.51633 | ν 3 = 64.1 |
| R 5 = 325.07 | D 5 = Variable | | |
| R 6 = 238.10 | D 6 = 1.80 | N 4 = 1.69680 | ν 4 = 55.5 |
| R 7 = 34.72 | D 7 = 7.39 | | |
| R 8 = −49.15 | D 8 = 1.70 | N 5 = 1.71299 | ν 5 = 53.8 |
| R 9 = 84.48 | D 9 = 2.11 | | |
| R10 = 81.21 | D10 = 5.25 | N 6 = 1.84666 | ν 6 = 23.9 |
| R11 = −226.79 | D11 = Variable | | |
| R12 = Stop | D12 = 1.00 | | |
| R13 = 655.80 | D13 = 7.00 | N 7 = 1.51742 | ν 7 = 52.4 |
| R14 = −50.87 | D14 = 1.35 | | |
| R15 = −40.13 | D15 = 2.10 | N 8 = 1.77250 | ν 8 = 49.6 |
| R16 = −62.86 | D16 = 31.11 | | |
| R17 = −192.16 | D17 = 3.00 | N 9 = 1.80518 | ν 9 = 25.4 |
| R18 = 192.16 | D18 = 11.85 | N10 = 1.51633 | ν10 = 64.1 |
| R19 = −59.83 | D19 = 0.20 | | |
| R20 = 1636.82 | D20 = 6.30 | N11 = 1.51633 | ν11 = 64.1 |
| R21 = −126.64 | | | |

| Variable Separation | Focal Length | | |
|---|---|---|---|
| | 106.83 | 148.88 | 203.88 |
| D 5 | 3.02 | 13.92 | 20.04 |
| D11 | 38.92 | 23.38 | 4.31 |

Numerical Example 5 (FIGS. 5, 19, 20 and 21):
F = 106.76   FNO = 1:4.5   2ω = 39.8°–20.6°

| | | | |
|---|---|---|---|
| R 1 = 131.62 | D 1 = 3.00 | N 1 = 1.80518 | ν 1 = 25.4 |
| R 2 = 69.38 | D 2 = 7.33 | N 2 = 1.51633 | ν 2 = 64.1 |
| R 3 = −273.25 | D 3 = 0.20 | | |
| R 4 = 65.20 | D 4 = 5.45 | N 3 = 1.51633 | ν 3 = 64.1 |
| R 5 = 743.16 | D 5 = Variable | | |
| R 6 = 575.41 | D 6 = 1.80 | N 4 = 1.69680 | ν 4 = 55.5 |
| R 7 = 32.91 | D 7 = 7.40 | | |
| R 8 = −47.06 | D 8 = 1.60 | N 5 = 1.71299 | ν 5 = 53.8 |
| R 9 = 106.61 | D 9 = 1.36 | | |
| R10 = 80.75 | D10 = 5.00 | N 6 = 1.80518 | ν 6 = 25.4 |
| R11 = −147.08 | D11 = Variable | | |
| R12 = Stop | D12 = 1.00 | | |
| R13 = 192.49 | D13 = 5.37 | N 7 = 1.51633 | ν 7 = 64.1 |
| R14 = −81.00 | D14 = 2.80 | | |
| R15 = −39.83 | D15 = 4.51 | N 8 = 1.78590 | ν 8 = 44.2 |
| R16 = −49.69 | D16 = 33.49 | | |
| R17 = −258.28 | D17 = 2.70 | N 9 = 1.84666 | ν 9 = 23.9 |
| R18 = 245.63 | D18 = 1.15 | | |
| R19 = 569.29 | D19 = 9.50 | N10 = 1.51633 | ν10 = 64.1 |
| R20 = −62.54 | D20 = 0.20 | | |
| R21 = 969.95 | D21 = 5.30 | N11 = 1.51633 | ν11 = 64.1 |
| R22 = −153.12 | | | |

| Variable Separation | Focal Length | | |
|---|---|---|---|
| | 106.77 | 149.47 | 202.86 |
| D 5 | 1.63 | 13.45 | 19.75 |
| D11 | 38.23 | 23.66 | 5.98 |

Numerical Example 6 (FIGS. 6, 22, 23 and 24):
F = 106.80   FNO = 1:4.5   2ω = 39.8°–20.6°

| | | | |
|---|---|---|---|
| R 1 = 127.52 | D 1 = 3.00 | N 1 = 1.80518 | ν 1 = 25.4 |
| R 2 = 61.21 | D 2 = 8.09 | N 2 = 1.51633 | ν 2 = 64.1 |
| R 3 = −341.36 | D 3 = 0.20 | | |
| R 4 = 54.33 | D 4 = 6.50 | N 3 = 1.51633 | ν 3 = 64.1 |
| R 5 = 1355.13 | D 5 = Variable | | |
| R 6 = 536.64 | D 6 = 1.80 | N 4 = 1.69680 | ν 4 = 55.5 |
| R 7 = 31.00 | D 7 = 5.50 | | |
| R 8 = −127.56 | D 8 = 1.60 | N 5 = 1.69680 | ν 5 = 55.5 |
| R 9 = 62.50 | D 9 = 1.04 | | |
| R10 = 50.24 | D10 = 4.86 | N 6 = 1.84666 | ν 6 = 23.9 |
| R11 = −814.75 | D11 = 6.34 | | |
| R12 = −55.60 | D12 = 1.80 | N 7 = 1.69680 | ν 7 = 55.5 |
| R13 = −164.52 | D13 = Variable | | |
| R14 = Stop | D14 = 1.00 | | |
| R15 = 157.91 | D15 = 6.24 | N 8 = 1.51633 | ν 8 = 64.1 |
| R16 = −109.09 | D16 = 4.69 | | |
| R17 = −40.36 | D17 = 2.00 | N 9 = 1.83400 | ν 9 = 37.2 |
| R18 = −48.53 | D18 = 26.90 | | |
| R19 = −187.90 | D19 = 2.70 | N10 = 1.84666 | ν10 = 23.9 |
| R20 = 327.82 | D20 = 1.54 | | |
| R21 = −2060.37 | D21 = 8.58 | N11 = 1.51633 | ν11 = 64.1 |
| R22 = −59.27 | D22 = 0.20 | | |
| R23 = 203.82 | D23 = 7.57 | N12 = 1.51633 | ν12 = 64.1 |
| R24 = −132.46 | | | |

| Variable Separation | Focal Length | | |
|---|---|---|---|
| | 106.80 | 149.52 | 202.92 |
| D 5 | 1.72 | 11.85 | 17.50 |
| D13 | 31.01 | 18.55 | 3.39 |

Table 1

| Condition No. | Numerical Example | | | | | |
|---|---|---|---|---|---|---|
| | 1 | 2 | 3 | 4 | 5 | 6 |
| (1) | 1.12 | 1.22 | 1.19 | 1.23 | 1.31 | 1.43 |
| (2) | 1.02 | 0.94 | 1.97 | 0.93 | 0.90 | 0.90 |
| (3) | 0.40 | 0.40 | 0.40 | 0.37 | 0.37 | 0.31 |
| (4) | 0.82 | 0.78 | 0.80 | 0.91 | 0.88 | 0.81 |
| (5) | 0.03 | 0.03 | 0.03 | — | — | — |
| (6) | −0.004 | −0.004 | −0.004 | — | — | — |
| (7) | −11.91 | −12.47 | −10.83 | — | — | — |
| (8) | 0.06 | 0.09 | 0.07 | — | — | — |
| (9) | −0.07 | — | — | 0.86 | 0.41 | 0.81 |

Table 1-continued

| Condition No. | Numerical Example | | | | | |
|---|---|---|---|---|---|---|
| | 1 | 2 | 3 | 4 | 5 | 6 |
| (10) | −1.96 | — | — | −4.53 | −9.08 | −10.88 |

According to the invention, a zoom lens is constructed from, in order from the screen side, the first lens unit of positive refractive power, the second lens unit of negative refractive power and the third lens unit of positive refractive power, zooming from the wide-angle end to the telephoto end being performed by moving the lens units as described before, and the design of the lens units being specified as described before. Accordingly, it is possible to achieve a wide-angle zoom lens of simple form having its back focal distance elongated with a high optical performance over the entire zooming range suited to be used as, for example, a projection lens for the color-liquid-crystal projection television system.

What is claimed is:

1. A zoom lens comprising, in order from a first conjugate point, a first lens unit of positive refractive power, a second lens unit of negative refractive power and a third lens unit of positive refractive power, wherein the first conjugate point is at a longer distance from said lens units than a second conjugate point, and wherein zooming from a wide-angle end to a telephoto end is performed by axially moving said second and third lens units in such a manner than an air separation between said first and second lens units increases and an air separation between said second and third lens units decreases, and wherein the following conditions are satisfied:

$$1 < -\beta 3w < 1.5$$

$$0.8 < -\beta 2w < 1.2$$

$$0.25 < -f2/fw < 0.45$$

$$0.7 < e2w/fw < 1.1$$

where $\beta 2w$ and $\beta 3w$ represent image magnifications for an infinitely distant object of said second and third lens units in the wide-angle end, respectively, f2 represents the focal length of said second lens unit, e2w represents a principal point interval between said second lens unit and said third lens unit in the wide-angle end, and fw represents the shortest focal length of the entire lens system.

2. A zoom lens according to claim 1, wherein said third lens unit comprises, in order from the first conjugate point, a front lens sub-unit and a rear lens sub-unit with an air separation that is longest of all the air separations in the third lens unit positioned therebetween, said rear lens sub-unit comprising at least one negative lens and at least one positive lens, wherein letting the Abbe number and extraordinary dispersion ratio of the material of said positive lens be denoted by $\nu 32P$ and $\Theta 32P$, respectively, the following condition is satisfied:

$$\Theta 32P - (0.6438 - 0.001682\nu 32P) > 0.02$$

3. A zoom lens according to claim 2, wherein said front lens sub-unit includes a positive lens and a negative lens of meniscus form convex toward a second conjugate point at a shorter distance, satisfying the following conditions:

$$-0.5 < (R31PF + R31PR)/(R31PF - R31PR) < 1.3$$

$$-15 < (R31NF + R31NR)/(R31NF - R31NR) < -1$$

where R31PF and R31PR are the radii of curvature of lens surfaces on the side of the first conjugate point and on the side of the second conjugate point of said positive lens of said front lens sub-unit, respectively, and R31NF and R31NR are the radii of curvature of lens surfaces on the side of the first conjugate point and on the side of the second conjugate point of said negative lens of said front lens sub-unit, respectively.

4. A zoom lens according to claim 1, wherein said third lens unit comprises, in order from the first conjugate point, a front lens sub-unit and a rear lens sub-unit with an air separation that is longest of all the air separations in the third lens unit positioned therebetween, said rear lens sub-unit comprising at least one negative lens, wherein letting the Abbe number and extraordinary dispersion ratio of the material of said negative lens be denoted by $\nu 32N$ and $\Theta 32N$, respectively, the following condition is satisfied:

$$\Theta 32N - (0.6438 - 0.001682\nu 32N) < 0.003$$

5. A zoom lens according to claim 1, wherein said second lens unit comprises, in order from the first conjugate point, a negative first lens, a negative second lens, a positive third lens and a negative fourth lens of meniscus shape convex toward the second conjugate point at a shorter distance.

6. A zoom lens according to claim 5, satisfying the following conditions:

$$-20 < (R22NF + R22NR)/(R22NF - R22NR) < -6$$

$$0.04 < D22N/fw\,0.12$$

where R22NF and R22NR are the radii of curvature of lens surfaces on the side of the first conjugate point and on the side of the second conjugate point of said negative fourth lens, respectively and wherein D22N is the thickness on the optical axis of the negative fourth lens of said second lens unit.

* * * * *

UNITED STATES PATENT AND TRADEMARK OFFICE
CERTIFICATE OF CORRECTION

PATENT NO. : 5,257,134
DATED : October 26, 1993
INVENTOR(S) : SABURO SUGAWARA

It is certified that error appears in the above-indentified patent and that said Letters Patent is hereby corrected as shown below:

COLUMN 3
　　line 43, "invention" should read --invention.--.

COLUMN 4
　　line 25, "$0.7<e_{2w}/f_w 1.1...(4)$" should read --$0.7<e_{2w}/f_w<1.1...(4)$--.

COLUMN 6
　　line 58, "(-6)" should read --(6)--.

COLUMN 7
　　line 9, "$-20<(R22NF+R22NR)/(R22NF=R22NR)<-6...(7)$" should read -- $-20<(R22NF+R22NR)/(R22NF-R22NR)<-6...(7)$ --;

line 44, "$-0.5<(R31PF+R31PR/(R31PF-R31PR)\ 1.3...(9)$" should read -- $-0.5<(R31PF+R31PR)/(R31PF-R31PR)<1.3...(9)$ --;

line 46, "$-15<(R31NF+R31NR)/(R31NF-R31NR)<...(10)$" should read -- $-15<(R31NF+R31NR)/(R31NF-R31NR)<-1...(10)$ --; and line 68, "the" (first occurrence) should be deleted.

COLUMN 8
　　Ex. 1, "R13 = 96.42" should read --R13 = -96.42--.

UNITED STATES PATENT AND TRADEMARK OFFICE
CERTIFICATE OF CORRECTION

PATENT NO. : 5,257,134
DATED : October 26, 1993
INVENTOR(S) : SABURO SUGAWARA

It is certified that error appears in the above-indentified patent and that said Letters Patent is hereby corrected as shown below:

COLUMN 11
   line 32, "than" should read --that--.

COLUMN 12
   line 53, "$0.04<D22N/fw0.12$" should read --$0.04 <D22N/fw<0.12$--.

Signed and Sealed this

Twelfth Day of July, 1994

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,257,134
DATED : October 26, 1993
INVENTOR(S) : SABURO SUGAWARA

It is certified that error appears in the above-indentified patent and that said Letters Patent is hereby corrected as shown below:

On The Title Page Item
    [22], "Filed:   Jun. 3, 1992" should read
         --Filed:   Jun. 30, 1992--.

Signed and Sealed this

Twenty-seventh Day of September, 1994

Attest:

BRUCE LEHMAN

*Attesting Officer*      *Commissioner of Patents and Trademarks*